US012710834B2

(12) United States Patent
Watanabe

(10) Patent No.: US 12,710,834 B2
(45) Date of Patent: Aug. 18, 2026

(54) ELECTRONIC PEN

(71) Applicant: Wacom Co., Ltd., Saitama (JP)

(72) Inventor: Daisuke Watanabe, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 19/073,895

(22) Filed: Mar. 7, 2025

(65) Prior Publication Data

US 2025/0208724 A1 Jun. 26, 2025

Related U.S. Application Data

(63) Continuation of application No. PCT/JP2023/029495, filed on Aug. 15, 2023.

(30) Foreign Application Priority Data

Sep. 14, 2022 (JP) ................................ 2022-146185

(51) Int. Cl.
*G06F 3/0354* (2013.01)
*B43K 24/08* (2006.01)
(Continued)

(52) U.S. Cl.
CPC .......... *G06F 3/03545* (2013.01); *B43K 24/08* (2013.01); *G06F 3/0383* (2013.01); *G06F 3/0442* (2019.05); *G06F 3/046* (2013.01)

(58) Field of Classification Search
CPC .. G06F 3/03545; G06F 3/0383; G06F 3/0442; G06F 3/046; B43K 24/08
See application file for complete search history.

(56) References Cited

U.S. PATENT DOCUMENTS 10,739,872 B2 * 8/2020 Kamiyama .......... B43K 24/084
10,921,909 B2 * 2/2021 Ushiku ............... G06F 3/03545
(Continued)

FOREIGN PATENT DOCUMENTS

JP 2011186803 A 9/2011
JP 2013161307 A 8/2013
(Continued)

OTHER PUBLICATIONS

International Search Report, dated Oct. 31, 2023, for International Application PCT/JP2023/029495. (2 pages) (English translation).

*Primary Examiner* — Michael Pervan
(74) *Attorney, Agent, or Firm* — Seed Intellectual Property Law Group LLP

(57) ABSTRACT

Provided is an electronic pen including a tubular pen housing, a first position indication portion arranged on one end side of the pen housing in an axial direction, a second position indication portion arranged on another end side of the pen housing in the axial direction, and a knock cam mechanism portion driven by a load applied from the other end side in the axial direction. The electronic pen further includes an elastic member for the knock cam mechanism portion to push in and out a front end side of the first position indication portion from an opening of the pen housing when a pressure larger than a pressure applied to the front end side, located on the other end side in the axial direction, of the second position indication portion during use of the second position indication portion is applied to the other end side in the axial direction.

20 Claims, 16 Drawing Sheets

(51) Int. Cl.

| | |
|---|---|
| ***G06F 3/038*** | (2013.01) |
| ***G06F 3/044*** | (2006.01) |
| ***G06F 3/046*** | (2006.01) |

(56) References Cited

U.S. PATENT DOCUMENTS

| | | | | |
|---|---|---|---|---|
| 12,001,618 | B2 * | 6/2024 | Watanabe | G06F 3/03546 |
| 2018/0164908 | A1 * | 6/2018 | Tanaka | G06F 3/0383 |
| 2019/0025951 | A1 * | 1/2019 | Kamiyama | B43K 7/12 |
| 2019/0179434 | A1 * | 6/2019 | Tanaka | G06F 3/046 |
| 2020/0218371 | A1 * | 7/2020 | Ushiku | B43K 24/08 |
| 2022/0413639 | A1 | 12/2022 | Watanabe et al. | |

FOREIGN PATENT DOCUMENTS

| | | | |
|---|---|---|---|
| JP | 5959038 | B1 | 8/2016 |
| WO | 2021200521 | A1 | 10/2021 |

* cited by examiner 42c
42b
42a
42
420
41
41a
41e
41d
41c
41b
41f
430
43a
43
43b
48
47
4
54
46a
46
45
53
46b
52
5
Ra
51
21b
21
21d
21c
21a
2a
Nk
44
44a
6

FIG. 3B
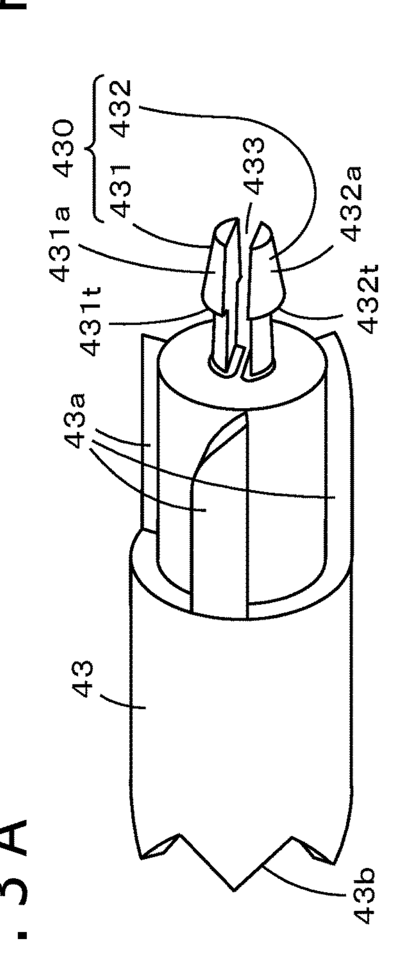
FIG. 3A
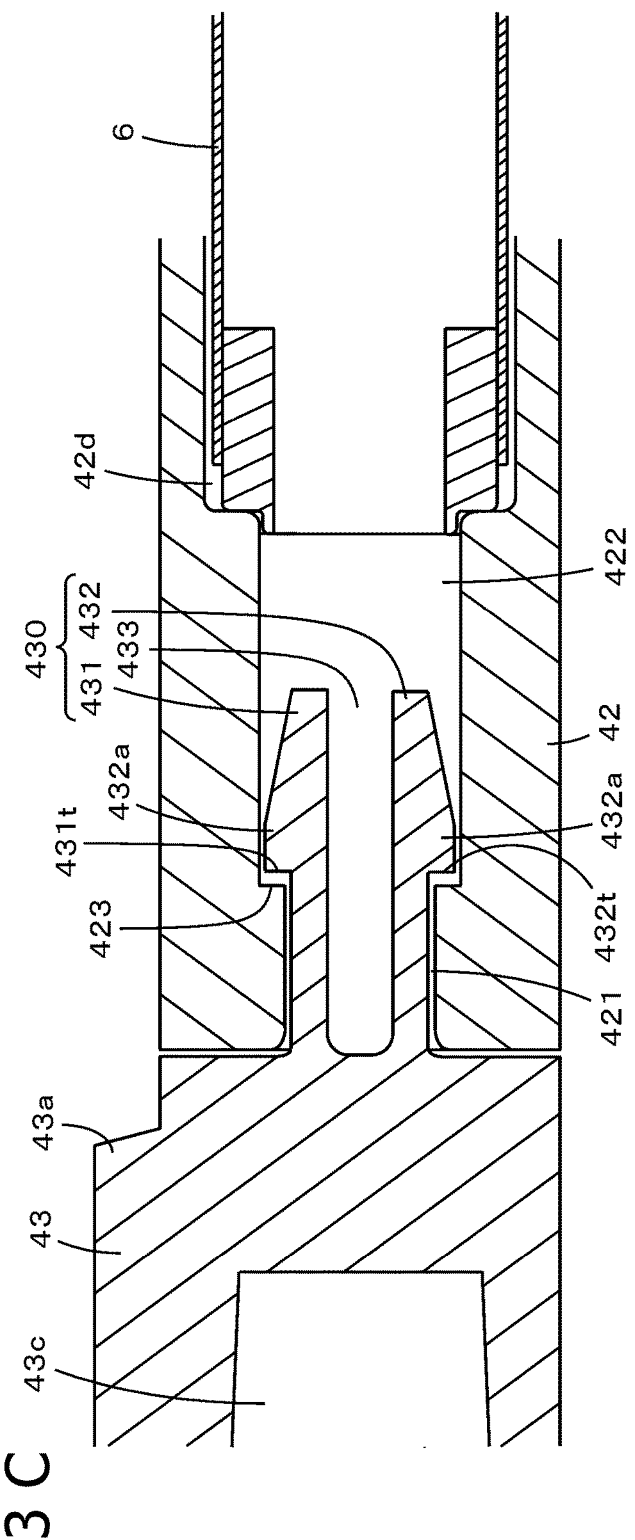
FIG. 3C 54
541b
541m
541a
543
542
544
R0
5
56
53
531
532
55
51b
57
52
521
522
522a
51
51a
541
544a
6
66
63
631
632
65
61b
62
621
622
622a
61
61a FIG.5
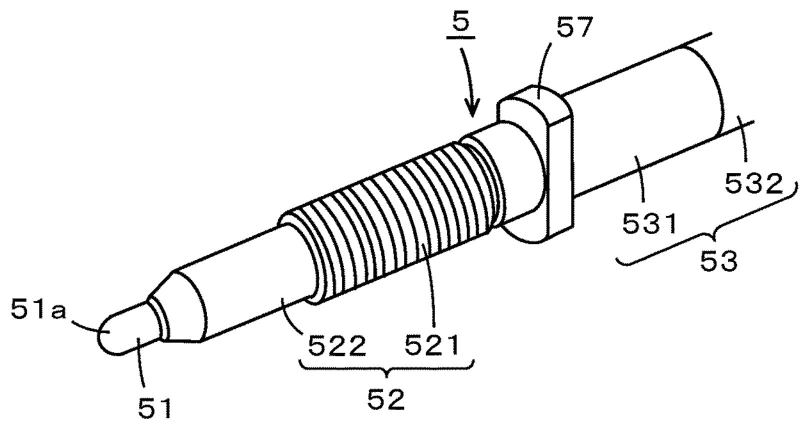
FIG.6A
FIG.6B
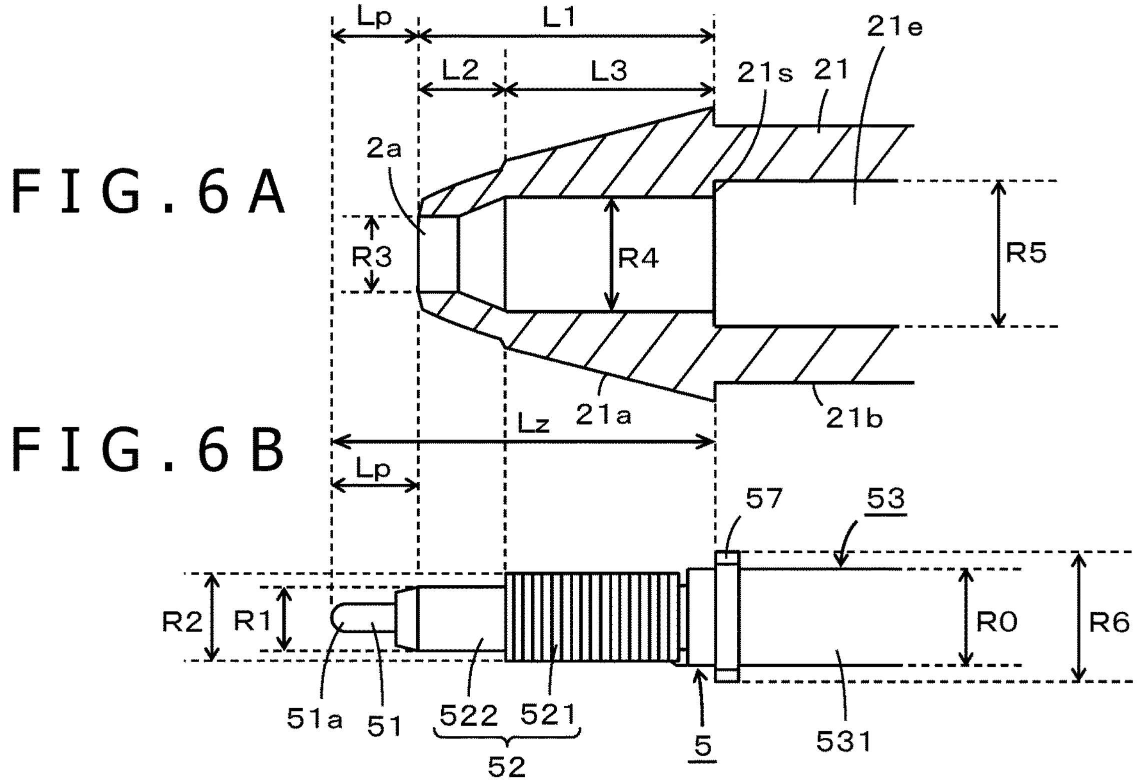

ELECTRONIC PEN

BACKGROUND

Technical Field

The disclosure relates to an electronic pen used along with a position detection apparatus, the electronic pen including a mechanism that uses a knock system to push in and out a pen tip.

Description of the Related Art

Further miniaturization of a portable electronic device is also strongly demanded due to the preference for miniaturization in recent years. An electronic pen has started being used along with a position detection sensor mounted on this type of small electronic device, and a thinner electronic pen is demanded.

Recently, the electronic pen is considered to be an extension of stationery, and there is also a request for forming a module of internal components of the electronic pen to allow handling the electronic pen similarly to a refill (or a cartridge) of a ballpoint pen. In the specification, a thing that includes an integrated module of constituent parts of a position indication portion inside a pen housing of an electronic pen and that can be replaced like a refill of a ballpoint pen will hereinafter be referred to as an electronic pen cartridge.

The applicant has already proposed a knock-type electronic pen in which an electronic pen cartridge for the electronic pen can be handled similarly to a refill of a ballpoint pen and in which a housing of the knock-type ballpoint pen as stationery can be used as a pen housing of the electronic pen (for example, see Japanese Patent No. 5959038).

Incidentally, an electronic pen including an electronic eraser function portion is also provided. The electronic eraser function portion has a configuration similar to the configuration of a position indication portion for writing input, and the electronic eraser function portion is used for deleting information written and input on the position detection sensor by the position indication portion of the electronic pen. In this case, the position indication portion for writing input is arranged on one end side of the tubular pen housing in the axial direction, and a position indication portion included in the electronic eraser function portion is arranged on another end side of the tubular pen housing in the axial direction.

In the case of the knock-type electronic pen, the position indication portion included in the electronic eraser function portion can be provided on the side where the knock operation is performed.

However, when a knock operation portion of a knock cam mechanism portion is pressed down to protrude the position indication portion for writing input from one opening of the housing, the pressure (load) for pressing down is conventionally not a large load in order to make the knock operation relatively easy. Therefore, when the knock operation portion side is brought into contact with an input surface of the position detection sensor to apply pressure in order to activate the position indication portion included in the electronic eraser function portion, a knock mechanism may be activated, and there is a problem that the usability of the electronic eraser function portion is poor.

Note that there is a similar problem when the position indication portion for writing input is provided on the knock portion side instead of the position indication portion included in the electronic eraser function portion.

BRIEF SUMMARY

Embodiments of the disclosure provide a position indicator that can solve the problems.

To solve the problems, provided is an electronic pen including a tubular pen housing, a first position indication portion arranged on a first end side of the pen housing in an axial direction of the pen housing, a second position indication portion arranged on a second end side of the pen housing in the axial direction, and a knock cam mechanism portion driven by a load in the axial direction applied from the second end side in the axial direction. The first position indication portion is arranged such that a front end side that indicates a position is able to be pushed in and out by the knock cam mechanism portion from an opening on the first end side of the pen housing in the axial direction. The second position indication portion is arranged such that the front end side that indicates a position is located on the second end side in the axial direction. The electronic pen further includes an elastic member for the knock cam mechanism portion to push in and out the front end side of the first position indication portion from the opening when a pressure larger than a pressure applied to the front end side of the second position indication portion during use of the second position indication portion is applied from the second end side in the axial direction.

In the electronic pen with the configuration described above, the knock cam mechanism portion includes the elastic member for the knock cam mechanism portion to push in and out the front end side of the first position indication portion from the opening of the pen housing when the pressure larger than the pressure applied to the front end side that indicates the position during the use of the second position indication portion is applied to the second end side of the pen housing in the axial direction.

Therefore, according to the electronic pen with the configuration described above, the knock cam mechanism portion does not perform the operation of pushing in and out the front end side of the first position indication portion from the opening in a range of the pressure applied to the front end side of the second position indication portion during the use of the second position indication portion, and the usability of the second position indication portion is excellent.

BRIEF DESCRIPTION OF THE SEVERAL VIEWS OF THE DRAWINGS

FIGS. 3A to 3C are diagrams for describing a coupling section of main parts of the electronic pen body portion module in the configuration example of FIG. 2;

FIG. 5 is a diagram for describing main portions of the first position indication portion in the electronic pen according to the embodiment of the disclosure;

FIGS. 6A and 6B are diagrams for describing the main portions of the first position indication portion and main portions of a pen housing in the electronic pen according to the embodiment of the disclosure;

FIGS. 11A and 11B are diagrams for describing the assembly procedure of the electronic pen body portion module included in the electronic pen according to the embodiment of the disclosure;

FIGS. 12A and 12B are diagrams for describing a state in which a pen tip side of the first position indication portion is housed in the pen housing in the electronic pen body portion module included in the electronic pen according to the embodiment of the disclosure;

FIGS. 13A and 13B are diagrams for describing a state in which the pen tip side of the first position indication portion is delivered from an opening of the pen housing in the electronic pen body portion module included in the electronic pen according to the embodiment of the disclosure;

DETAILED DESCRIPTION

An electronic pen according to an embodiment of the disclosure will hereinafter be described with reference to the drawings.

Overview of Electronic Pen of Embodiment

Figures 1A, 1B, 1C:
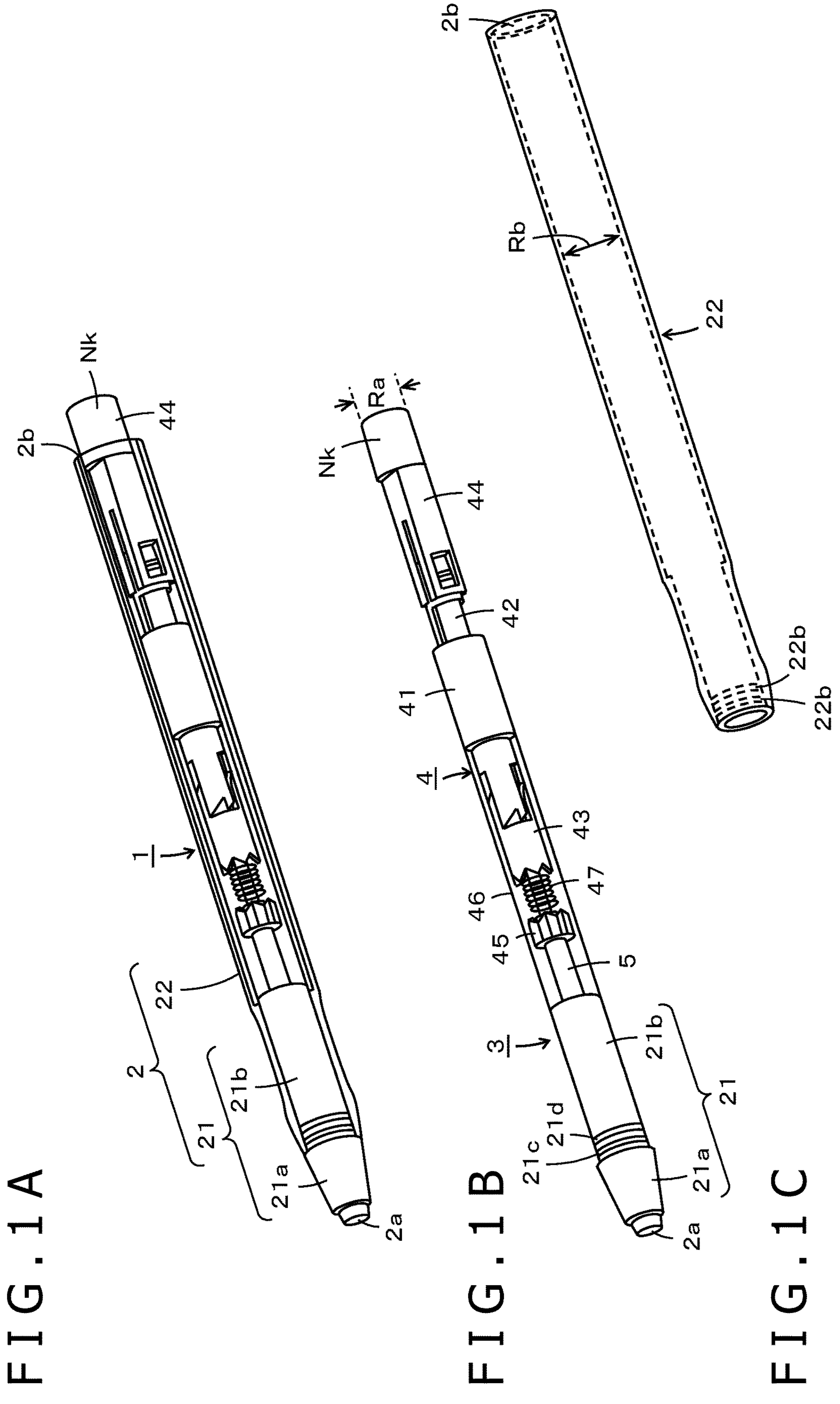
FIGS. 1A to 1C are diagrams for describing an overview of a configuration example of an electronic pen according to an embodiment of the disclosure.

FIGS. 1A to 1C are diagrams for describing an overview of an electronic pen 1 of the embodiment. In the electronic pen 1 of this example, a first position indication portion includes a first electronic pen cartridge for writing input, and a second position indication portion includes a second electronic pen cartridge provided with an electronic eraser function. In the embodiment, both the first position indication portion and the second position indication portion adopt an electromagnetic resonance system.

In the electronic pen 1 of the embodiment, the first electronic pen cartridge for writing input as an example of the first position indication portion and the second electronic pen cartridge provided with the electronic eraser function as an example of the second position indication portion are arranged in an axial direction in a hollow portion of a tubular pen housing 2 as described below. In this case, the first electronic pen cartridge and the second electronic pen cartridge are arranged such that a front end side of the first electronic pen cartridge is one end side of the pen housing 2 in the axial direction and that a front end side of the second electronic pen cartridge is another end side of the pen housing 2 in the axial direction.

Note that, in the following description, the one end side of the pen housing 2 in the axial direction will be referred to as a pen tip side, and the other end side will be referred to as a back end side, for the convenience. In addition, the first electronic pen cartridge for writing input as an example of the first position indication portion will be referred to as a writing input cartridge, and the second electronic pen cartridge provided with the electronic eraser function as an example of the second position indication portion will be referred to as a deletion cartridge.

In the electronic pen 1 of the embodiment, the writing input pen cartridge and the deletion cartridge arranged in the axial direction are coupled to each other in a knock cam mechanism portion. The writing input cartridge and the deletion cartridge are moved in the axial direction according to a knock operation for driving the knock cam mechanism portion, and the front end side of the writing input cartridge is pushed in and out from an opening 2*a* on the pen tip side of the pen housing 2. Note that a part Nk (hereinafter, referred to as a knock operation portion Nk) that receives the knock operation of the knock cam mechanism portion protrudes outside from an opening 2*b* on the back end side of the pen housing 2. The front end side of the deletion cartridge is positioned in a housing of the knock operation portion Nk.

FIG. 1A is a perspective view for describing an appearance of the electronic pen 1 of the embodiment. The pen housing 2 of the electronic pen 1 of the embodiment contains, for example, resin. A pen tip side housing portion 21 that houses a pen tip side part of the writing input cartridge and a back end side housing portion 22 (see FIG. 1C) that houses a back end side part of the writing input cartridge and a part including the deletion cartridge and the knock cam mechanism portion are coupled to each other in the axial direction to form the pen housing 2. In FIG. 1A, the back end side housing portion 22 contains a transparent material, and the inside of the back end side housing portion 22 can be viewed.

In the electronic pen 1 of the embodiment, body constituent parts of the electronic pen including the writing input cartridge, the deletion cartridge, and the knock cam mechanism portion are put in one module part. FIG. 1B illustrates this module part, denoted by 3, of the embodiment, and the module part 3 includes the pen tip side housing portion 21. The module part 3 will hereinafter be referred to as an electronic pen body portion module 3.

The pen tip side housing portion 21 has a tubular body. One side of the pen tip side housing portion 21 in the axial direction includes a tapered portion 2Aa gradually becoming narrower, and another side of the pen tip side housing portion 21 in the axial direction includes a tubular portion 21*b* whose outer diameter is a diameter Ra equal to or slightly smaller than the inner diameter of the back end side housing portion 22. An opening of the tapered portion 2Aa on the narrower front end side is the opening 2*a* of the pen housing 2 that protrudes the front end side of the writing input cartridge in a manner that the front end side can be pushed in and out.

In the embodiment, an electronic pen body configuration portion 4 provided by integrally coupling the writing input cartridge, the deletion cartridge, and the knock cam mechanism portion to one another is coupled to the tubular portion 21*b* side of the pen tip side housing portion 21 to form the electronic pen body portion module 3.

The back end side housing portion 22 in the embodiment has a tubular shape as illustrated in FIG. 1C, and the inner diameter of the back end side housing portion 22 on the side coupled to the tubular portion 21*b* of the pen tip side housing portion 21 is equal to or slightly larger than the outer diameter Ra of the tubular portion 21*b* of the pen tip side housing portion 21 as described above. An inner diameter Rb of the back end side housing portion 22 on the back end side is larger than the diameter Ra.

As illustrated in FIGS. 1B and 1C, the electronic pen body portion module 3 is inserted into a hollow portion of the back end side housing portion 22 from the electronic pen body configuration portion 4 side and pushed into the tubular portion 21*b* of the pen tip side housing portion 21 to thereby couple the pen tip side housing portion 21 and the back end side housing portion 22 of the electronic pen body portion module 3 to each other. The electronic pen 1 illustrated in FIG. 1A is provided in this way. In this case, the knock operation portion Nk at the end portion of the electronic pen body portion module 3 on the back end side protrudes outside from the opening of the back end side housing portion 22 on the back end side, the opening being the opening 2*b* of the pen housing 2 on the back end side, as illustrated in FIG. 1A.

In the embodiment, ring-shaped recess grooves 21*c* and 21*d* are formed on the tubular portion 21*b* of the pen tip side housing portion 21, and ring-shaped protrusion portions 22*a* and 22*b* are formed in an inner wall of the back end side housing portion 22 at positions corresponding to the recess grooves 21*c* and 21*d*. In this way, when the tubular portion 21*b* of the pen tip side housing portion 21 of the electronic pen body portion module 3 is inserted and coupled to the hollow portion of the back end side housing portion 22, the ring-shaped recess grooves 21*c* and 21*d* and the ring-shaped protrusion portions 22*a* and 22*b* are fitted and locked to each other while the pen tip side housing portion 21 and the back end side housing portion 22 are coupled to each other. However, the pen tip side housing portion 21 and the back end side housing portion 22 can be pulled in directions away from each other to thereby separate the electronic pen body portion module 3 and the back end side housing portion 22 from each other.

Note that the external shape of the back end side housing portion 22 illustrated in FIG. 1C is an example. The outer shape of the back end side housing portion 22 can be any shape as long as the back end side housing portion 22 can be pushed into and coupled to the tubular portion 21*b* of the pen tip side housing portion 21 of the electronic pen body portion module 3, and the outer shape can be various shapes, such as a shape easy for a user to grip. That is, the back end side housing portion 22 can have any shape of a cosmetic case as long as the back end side housing portion 22 can house the electronic pen body configuration portion 4 of the electronic pen body portion module 3 and can be coupled to the pen tip side housing portion 21.

Although the pen tip side housing portion 21 and the back end side housing portion 22 are coupled to each other by press-fitting and by the locking structure of the ring-shaped recess grooves and protrusion portions in the embodiment, the configuration is not limited to this. For example, screw portions may be formed on the outer circumference of the pen tip side housing portion 21 and the inner wall surface of the back end side housing portion 22, and they may be screwed.

Configuration Example of Electronic Pen Body Portion Module 3

Figure 2:
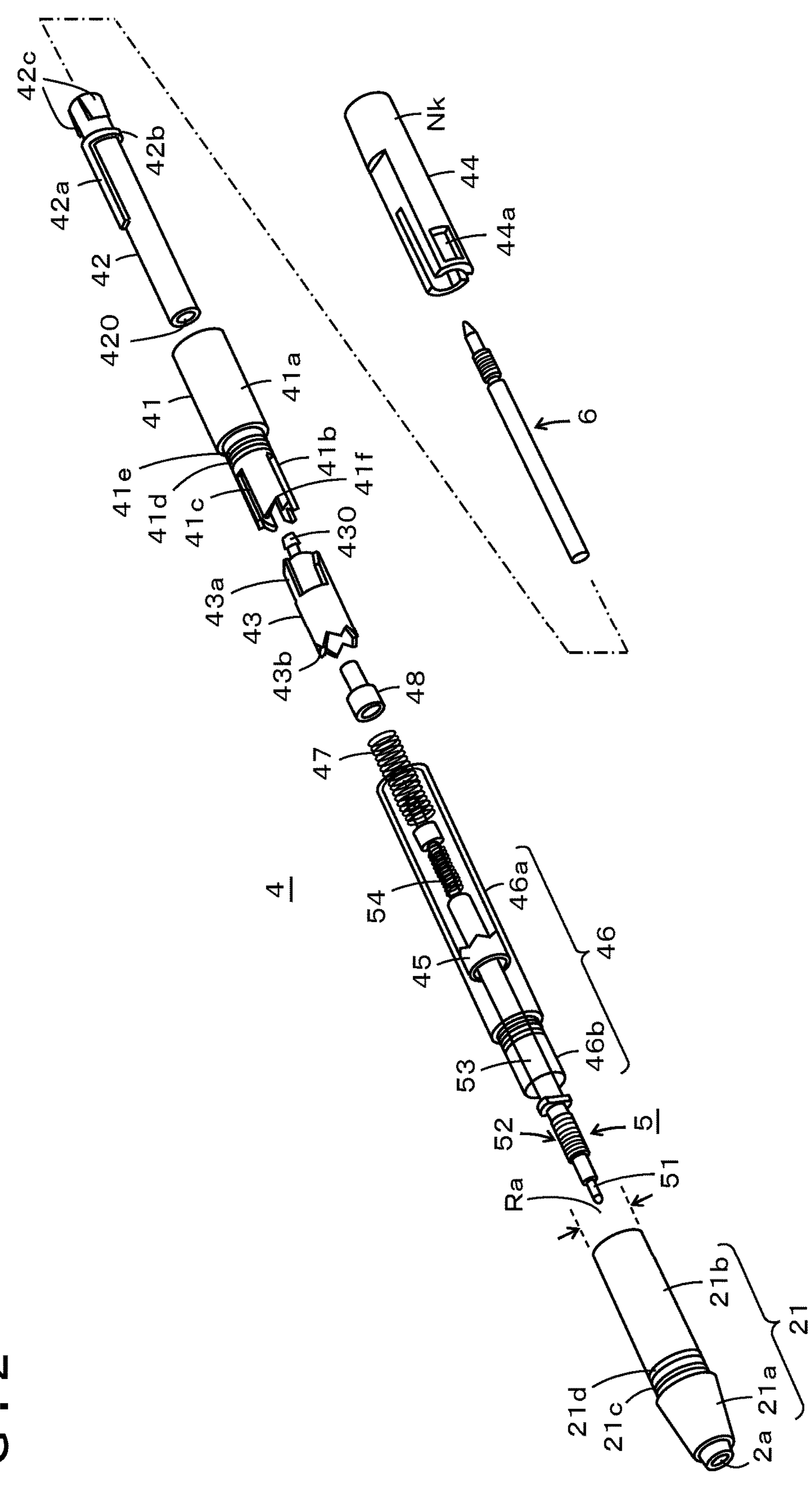
FIG. 2 is an exploded perspective view for describing a configuration example of an electronic pen body portion module included in the electronic pen according to the embodiment of the disclosure.

FIG. 2 is an exploded perspective view of the electronic pen body portion module 3. In FIG. 2, the pen tip side housing portion 21 and the electronic pen body configuration portion 4 are separated from each other, and the parts included in the electronic pen body configuration portion 4 are disassembled.

As illustrated in FIG. 2, the electronic pen body configuration portion 4 includes a writing input cartridge 5, a deletion cartridge 6, and parts for coupling the knock cam mechanism portion, the writing input cartridge 5, and the deletion cartridge to one another in the axial direction and integrally moving them in the axial direction according to a knock operation. The knock cam mechanism portion includes a cam body portion, a rotor portion, a knock rod portion, and an elastic return member. The elastic return member is a member for returning the pen tip side of the writing input cartridge 5 from the state in which the pen tip side protrudes outside from the opening 2*a* of the pen housing 2 on the pen tip side (in the following description, referred to as the opening 2*a* of pen tip side housing portion 21 in some cases) to the state in which the pen tip side is housed inside the pen housing 2.

The parts include a knock case portion 41 as an example of the cam body portion, a back end side shaft portion 42 as an example of the knock rod portion, a front shaft portion 43 as an example of the rotor portion, a back end cap member 44 in which the back end portion is the knock operation portion Nk, a gear portion 45, a gear holder portion 46 that holds the gear portion 45, a coil spring 47 included in the elastic return member, and a spacer 48. Each part contains resin in the example, except for the coil spring 47.

The knock case portion 41 has a tubular shape, which is a cylindrical shape in the example. The knock case portion 41 includes a large diameter portion 41*a* whose outer diameter is equal to the diameter Ra and a small diameter portion 41*b* whose outer diameter is slightly smaller than the inner diameter of the gear holder portion 46. The small diameter portion 41*b* is provided with a plurality of groove portions 41*c* and locking portions 41*f* included in cam pieces, and the plurality of groove portions 41*c* and locking portions 41*f* are to be engaged with a plurality of blade portions 43*a* included in cam pieces of the front shaft portion 43 as an example of the rotor portion. As described later, the groove portions 41*c* are engaged with the blade portions 43*a* when the knock operation is not performed and the pen tip side of the writing input cartridge 5 is housed in the pen tip side housing portion 21. The locking portions 41*f* are engaged with the blade portions 43*a* when the pen tip side of the writing input cartridge 5 is locked while the pen tip side protrudes from the opening 2*a* of the pen tip side housing portion 21.

The back end side shaft portion 42 is a member with a tubular shape, which is a cylindrical shape in the example. The outer diameter of the back end side shaft portion 42 is smaller than the inner diameter of the tubular knock case portion 41, and the back end side shaft portion 42 is inserted into a hollow portion of the knock case portion 41 from the back end side. In this case, a protrusion section 42*a* in the axial direction is provided at a predetermined angular position in the circumferential direction of an outer circumference side surface of the back end side shaft portion 42, and the protrusion section 42*a* is fitted to a recess groove (not illustrated in FIG. 2) formed on an inner wall surface in a hollow portion of the knock case portion 41 to thereby prevent the back end side shaft portion 42 from rotating with respect to the knock case portion 41.

A ring-shaped protrusion portion 42*b* is formed on the back end side of the back end side shaft portion 42. The outer diameter of the ring-shaped protrusion portion 42*b* is the diameter Ra, and the back end side shaft portion 42 is inserted into the knock case portion 41 up to the position of the ring-shaped protrusion portion 42*b*.

In the embodiment, the inner diameter of the hollow portion of the back end side shaft portion 42 is larger than the outer diameter of the deletion cartridge 6, and the part on the opposite side of the front end side of the deletion cartridge 6 can be housed in the hollow portion of the back end side shaft portion 42. However, the diameter of the end portion side on the pen tip side of the hollow portion of the back end side shaft portion 42 is smaller than the outer diameter of the deletion cartridge 6, and the deletion cartridge 6 stays in the back end side shaft portion 43 without moving toward the pen tip from the back end side shaft portion 42.

In the case of the example, the length of the back end side shaft portion 42 in the axial direction is set to such a length that the pen tip side of the deletion cartridge 6 protrudes toward the back end from the back end side shaft portion 42 when the deletion cartridge 6 is housed in the hollow portion.

The back end cap member 44 is a tubular portion including a blocked back end portion, in which the inner diameter of the tubular portion is slightly larger than the outer diameter of the back end side shaft portion 42 while the outer diameter of the tubular portion is selected to be equal to the diameter Ra. The back end portion side of the back end cap member 44 is the knock operation portion Nk. The back end side shaft portion 42 includes a part further protruding toward the back end from the position of the ring-shaped protrusion portion 42*b*. The back end cap member 44 is placed over the protruding part, so that the front end portion of the deletion cartridge 6 is covered by the back end cap member 44.

In this case, the back end side shaft portion 42 includes an engagement protrusion portion 42*c* further protruding toward the back end from the position of the ring-shaped protrusion portion 42*b*, and the back end cap member 44 is provided with a through window 44*a* to which the engagement protrusion portion 42*c* is fitted. When the back end cap member 44 is coupled to the back end side of the back end side shaft portion 42, the engagement protrusion portion 42*c* is fitted to the through window 44*a* to prevent the back end cap member 44 from being easily separated from the back end side shaft portion 42. However, the back end cap member 44 can be strongly pulled toward the back end to detach the back end cap member 44 from the back end side shaft portion 42.

The front shaft portion 43 as an example of the rotor portion is arranged such that the side provided with the plurality of blade portions (protrusion sections) 43*a* is the small diameter portion 41*b* side of the knock case portion 41. The front shaft portion 43 has such a columnar shape that the plurality of blade portions 43*a* are engaged with the groove portions 41*c* of the small diameter portion 41*b* of the knock case portion 41 and integrated with the small diameter portion 41*b*. The blade portions 43*a* are provided on the knock case portion 41 side of the front shaft portion 43.

The outer diameter of the front shaft portion 43 is smaller than the inner diameter of the gear holder portion 46, and the front shaft portion 43 can move in the axial direction in the gear holder portion 46. A gear portion 43*b* provided with notches is formed on the pen tip side of the front shaft portion 43. The gear portion 43*b* is held and provided in the gear holder portion 46 and is meshed with the gear portion 45, which will be described later, to rotate the front shaft portion 43 by a predetermined angle.

In the embodiment, the front shaft portion 43 is coupled to the back end side shaft portion 42 inserted into the knock case portion 41, in a manner that the front shaft portion 43 can rotate with the axial direction as the axis of rotation. For the coupling, a coupling protrusion portion 430 for coupling the front shaft portion 43 to the back end side shaft portion 42 is formed on the front end portion of the front shaft portion 43 on the knock case portion 41 side of the small diameter portion 41*b*. Meanwhile, the pen tip side of the back end side shaft portion 42 is provided with a fitting portion 420 coupled to the coupling protrusion portion 430 of the front shaft portion 43 in a manner that the coupling protrusion portion 430 can rotate.

FIGS. 3A to 3C are enlarged views for describing the coupling section of the back end side shaft portion 42 and the front shaft portion 43. FIG. 3A is an enlarged perspective view of the front shaft portion 43. FIG. 3B is a vertical cross-sectional view of an enlarged perspective view of the back end side shaft portion 42. FIG. 3C is a vertical cross-sectional view of the state in which the back end side shaft portion 42 and the front shaft portion 43 are coupled to each other.

As illustrated in FIG. 3A, the coupling protrusion portion 430 of the front shaft portion 43 formed on the front end portion of the small diameter portion 41*b* includes two protrusion pieces 431 and 432 formed by separating a columnar member by a slit 433 including a center line position of the columnar member. The front shaft portion 43 contains an elastic resin, and the two protrusion pieces 431 and 432 can be elastically displaced toward the slit 433. The two protrusion pieces 431 and 432 are provided with tapered protrusion portions 431*a* and 432*a* on the sides opposite the slit 433 as illustrated in FIG. 3A. The tapered protrusion portions 431*a* and 432*a* are formed such that the diameter gradually increases from the front end side to a certain point of the length of the coupling protrusion portion 430 in the axial direction, and the tapered protrusion portions 431*a* and 432*a* include engagement step portions 431*t* and 432*t* at the certain point of the length of the coupling protrusion portion 430 in the axial direction.

Meanwhile, the back end side shaft portion 42 is provided with the fitting portion 420 including a small diameter hole portion 421 with a smaller diameter into which the coupling protrusion portion 430 is inserted and a large diameter hole portion 422 with a diameter larger than that of the small diameter hole portion 421. A step portion 423 to be engaged with the protrusion pieces 431 and 432 of the coupling protrusion portion 430 is formed between the small diameter hole portion 421 and the large diameter hole portion 422.

The coupling protrusion portion 430 of the front shaft portion 43 is inserted into the fitting portion 420 of the back end side shaft portion 42, and the front shaft portion 43 and the back end side shaft portion 42 are coupled to each other as illustrated in FIG. 3C. That is, when the front end portion of the coupling protrusion portion 430 of the front shaft portion 43 is inserted into the small diameter hole portion 421 of the fitting portion 420 of the back end side shaft portion 42, the two protrusion pieces 431 and 432 included in the coupling protrusion portion 430 are displaced toward the slit 433 in a direction crossing the axial direction, and the coupling protrusion portion 430 is inserted into the small diameter hole portion 421 of the fitting portion 420.

The two protrusion pieces 431 and 432 elastically return to the original state when the coupling protrusion portion 430 is pushed and the tapered protrusion portions 431*a* and 432*a* of the two protrusion pieces 431 and 432 are positioned in the space of the large diameter hole portion 422 of the fitting portion 420 of the back end side shaft portion 42. Consequently, the engagement step portions 431*t* and 432*t* of the tapered protrusion portions 431*a* and 432*a* of the two protrusion pieces 431 and 432 of the coupling protrusion portion 430 are engaged with the step portion 423 of the fitting portion 420 of the back end side shaft portion 42, and the front shaft portion 43 and the back end side shaft portion 42 maintain the coupling state, as illustrated in FIG. 3C.

In this case, the movement of the front shaft portion 43 in the rotation direction with the axial direction as the rotation center is not regulated when the front shaft portion 43 and the back end side shaft portion 42 are coupled to each other. Therefore, the front shaft portion 43 can rotate with respect to the back end side shaft portion 42 with the axial direction, as the rotation center.

Note that, in FIG. 3C, a recess portion 43*c* provided on the front shaft portion 43 is a fitting recess portion for fitting the spacer 48 coupled to the back end side of the writing input cartridge 5 to the front shaft portion 43 as descried later.

The constituent parts of FIG. 2 will further be described. The gear portion 45 is a portion engaged with the front shaft portion 43 to rotate the front shaft portion 43 by a predetermined angle, and the gear portion 45 is a part of the rotor portion in the example.

The gear holder portion 46 includes a tubular body including a large diameter portion 46*a* and a small diameter portion 46*b*, and the gear portion 45 is fixed and held at a predetermined position in the axial direction of a hollow portion of the gear holder portion 46.

The gear portion 45 is fixed and held at a position slightly closer to the pen tip in the axial direction in the large diameter portion 46*a* of the gear holder portion 46. The position of the gear portion 45 in the axial direction in the gear holder portion 46 is selected such that the front end side of the writing input cartridge 5 is housed in the pen tip side housing portion 21 in the non-knocked state and that the front end side can protrude from the opening 2*a* at the front end of the pen tip side housing portion 21 during the knock operation.

The outer diameter of the large diameter portion 46*a* of the gear holder portion 46 is equal to the outer diameter of the tubular portion 21*b* of the pen tip side housing portion 21, and the inner diameter of the large diameter portion 46*a* on the back end side of the position where the gear portion 45 is held is slightly larger than the outer diameter of the small diameter portion 41*b* of the knock case portion 41 as described above. The diameter of the large diameter portion 46*a* on the pen tip side of the position where the gear portion 45 is held is smaller than the diameter of the back end side, and the diameter is equal to the inner diameter of the small diameter portion 46*b* or larger than the inner diameter of the small diameter portion 46*b*. In this way, the inner diameter changes in the hollow portion of the large diameter portion 46*a* of the gear holder portion 46, and the gear portion 45 is held at the position of the step portion formed by the change in the inner diameter. Therefore, the gear portion 45 is arranged in the gear holder portion 46 in a manner that the gear portion 45 cannot move toward the pen tip in the axial direction.

The outer diameter of the small diameter portion 46*b* of the gear holder portion 46 is substantially equal to or slightly smaller than the inner diameter of the tubular portion 21*b* of the pen tip side housing portion 21, and the inner diameter of the small diameter portion 46*b* is larger than the outer diameter of the writing input cartridge 5 on the back end side such that the back end side of the writing input cartridge 5 can be inserted. The gear portion 45 has a ring shape, and the writing input cartridge 5 can be inserted into the gear portion 45.

The writing input cartridge 5 is arranged such that the back end side of the writing input cartridge 5 is housed in the large diameter portion 46*a* and the small diameter portion 46*b* of the gear holder portion 46 and that the front end side of the writing input cartridge 5 protrudes from the small diameter portion 46*b* toward the pen tip side housing portion 21, as illustrated in FIG. 2. As also described later, the back end side of the writing input cartridge 5 is fitted to the spacer 48 through the coil spring 47. The spacer 48 is fitted to the recess portion 43*c* of the front shaft portion 43 and locked. Therefore, the spacer 48 is fitted to the recess portion 43*c* of the front shaft portion 43, and the writing input cartridge 5 provided with the spacer 48 at the back end portion is locked to the front shaft portion 43 through the spacer 48.

In the embodiment, the outer diameter of the front shaft portion 43 is smaller than the inner diameter of the large diameter portion 46*a* of the gear holder portion 46, and the front shaft portion 43 is housed in the large diameter portion 46*a* of the gear holder portion 46 in a manner that the front shaft portion 43 can move, as described above. The outer diameter of the small diameter portion 41*b* of the knock case portion 41 is selected to be equal to or slightly smaller than the inner diameter of the large diameter portion 46*a* of the gear holder portion 46, and the small diameter portion 41*b* of the knock case portion 41 is plugged into the large diameter portion 46*a* of the gear holder portion 46 to couple and lock the gear holder portion 46 and the knock case portion 41 to each other.

In this case, ring-shaped protrusion portions 41*d* and 41*e* to be fitted to ring-shaped recess grooves on the inner wall of the large diameter portion 46*a* of the gear holder portion 46 are formed near the portion of the small diameter portion 41*b* of the knock case portion 41 coupled to the large diameter portion 41*a* in the embodiment. As a result, the gear holder portion 46 and the knock case portion 41 are coupled to each other, and the coupling state is locked.

In this way, the gear holder portion 46 and the knock case portion 41 are coupled to each other, and the gear holder portion 46 and the knock case portion 41 provide a case (housing) part of the electronic pen body configuration portion 4 in the embodiment. As described above, the deletion cartridge 6 is housed in the back end side shaft portion 42 coupled to the front shaft portion 43, and the back end cap member 44 is mounted on the back end side shaft portion 42, to provide the electronic pen body configuration portion 4.

In the embodiment, the small diameter portion 46*b* of the gear holder portion 46 of the electronic pen body configuration portion 4 provided in this way is press-fitted into the pen tip side housing portion 21 to couple the electronic pen body configuration portion 4 to the pen tip side housing portion 21, and the electronic pen body portion module 3 is provided.

Configuration Examples of Writing Input Cartridge 5 and Deletion Cartridge 6

Figures 4A, 4B, 4C:
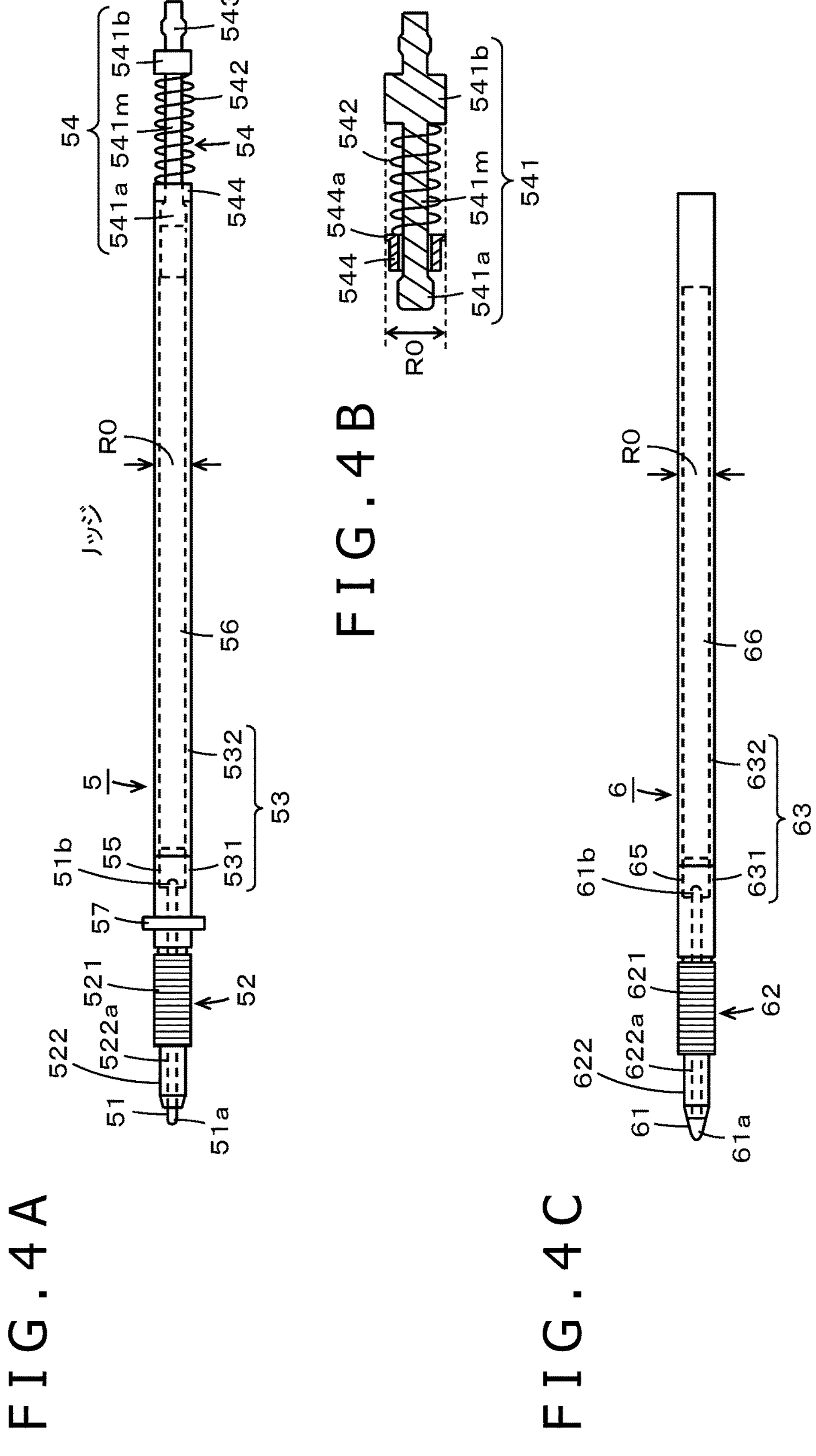
FIGS. 4A to 4C are diagrams for describing a configuration example of a first position indication portion and a second position indication portion in the electronic pen according to the embodiment of the disclosure.

FIG. 4A depicts a configuration example of the writing input cartridge 5 of the electronic pen 1 according to the embodiment. FIG. 4B is an enlarged cross-sectional view of an elastic displacement portion 54 provided on the back end side of the writing input cartridge 5. FIG. 4C depicts a configuration example of the deletion cartridge 6.

Configuration Example of Writing Input Cartridge 5

The writing input cartridge 5 in the electronic pen 1 of the embodiment includes a core body 51, a signal transmission member 52, a cartridge housing 53, and the elastic displacement portion 54 provided on the back end side of the cartridge housing 53 in this example as illustrated in FIG. 4A. The cartridge housing 53 includes a holder portion 531 that holds a pen pressure detection portion 55 and that also holds a circuit board 56 provided with an electronic circuit and a protection cover portion 532 with a function of housing and protecting the pen pressure detection portion 55 and the circuit board 56 held in the holder portion 531.

The core body 51 in the example contains a relatively hard elastic resin material, such as polyoxymethylene (POM). In the example, a front end portion 51*a* with a diameter larger than the diameter of a rod-shaped axis portion is formed on the pen tip side of the axis portion.

The signal transmission member 52 includes a coil 521 included in a resonant circuit that uses the electromagnetic resonance system to transmit and receive signals to and from the position detection apparatus and a magnetic core, which is a ferrite core 522 in the example, around which the coil 521 is wound. A through hole 522*a* is formed on the ferrite core 522 in the axial direction.

The diameter of the through hole 522*a* of the ferrite core 522 is larger than the diameter of the axis portion of the core body 51, and the axis portion of the core body 51 is fitted to the pen pressure detection portion 55 through the through hole 522*a*. In this case, the front end portion 51*a* of the core body 51 as a pen tip protrudes more than the ferrite core 522, and an end portion 51*b* on the back end side of the axis portion of the core body 51 is fitted to the pen pressure detection portion 55. In this way, the pressure (pen pressure) applied to the front end portion 51*a* of the core body 51 is applied to the pen pressure detection portion 55. The core body 51 can be attached to and detached from the pen pressure detection portion 55.

The pen pressure detection portion 55 includes, for example, a mechanism that changes the capacitance of a variable capacitor according to the applied pressure (pen pressure) (for example, see Japanese Patent Laid-Open No. 2011-186803). Note that the pen pressure detection portion 55 may include a variable capacitor including a semiconductor chip including a micro electro mechanical systems (MEMS) element (for example, see Japanese Patent Laid-Open No. 2013-161307). Note that the configuration of the pen pressure detection portion 55 is not limited to this example.

An electronic part, such as a capacitor that provides the resonant circuit along with the coil 521, is mounted on the circuit board 56. In the example, a conductor pattern for connecting the pen pressure detection portion 55 including the variable capacitor to the resonant circuit is formed on the circuit board 56.

The holder portion 531 of the cartridge housing 53 contains, for example, a resin material, and the holder portion 531 is fitted to the ferrite core 522 of the signal transmission member 52. The holder portion 531 includes a tubular portion (not illustrated) that holds the pen pressure detection portion 55 and a circuit board mounting table portion (not illustrated) that places and holds the circuit board 56.

The protection cover portion 532 of the cartridge housing 53 includes a pipe-shaped member containing a hard material, which is a pipe-shaped member containing metal in the example. The protection cover portion 532 includes a circuit portion protection member that protects the electrical circuit constituent parts of the pen pressure detection portion 55 held by the holder portion 531 and the circuit board 56.

More specifically, the cartridge housing 53 is provided by the holder portion 531 and the protection cover portion 532 being coupled to each other in the axial direction while a part of the tubular portion holding the pen pressure detection portion 55 of the holder portion 531 and the circuit board mounting table portion are housed in the hollow portion of the protection cover portion 532. In this case, the diameter of the tubular portion of the holder portion 531 and the diameter of the pipe-shaped member included in the protection cover portion 532 are an equal diameter R0 as illustrated in FIG. 4A.

As illustrated in FIGS. 4A and 4B, the elastic displacement portion 54 in the example includes a rod-shaped member 541 containing, for example, resin, and the rod-shaped member 541 is thinner than the inner diameter of the protection cover portion 532 of the cartridge housing 53. A coil spring 542 that can freely be expanded and contracted is loosely fitted to the rod-shaped member 541. In the example, one end portion 541*a* side of the rod-shaped member 541 in the axial direction is inserted and coupled to the opening on the back end side of the protection cover portion 532 of the cartridge housing 53.

The diameter of one end portion 541*a* of the rod-shaped member 541 in the axial direction is smaller than the inner diameter of the protection cover portion 532 and slightly larger than that of a middle part 541*m* to which the coil spring 542 is loosely fitted. The diameter of another end portion 541*b* of the rod-shaped member 541 in the axial direction is larger than that of the middle part 541*m*. A fitting projection portion 543 for fitting the writing input cartridge 5 to the recess portion 43*c* of the front shaft portion 43 is formed at a center part of the circular end surface of the other end portion 541*b*.

A ring-shaped member 544 is provided on the one end portion 541*a* side of the middle part 541*m* of the rod-shaped member 541. The ring-shaped member 544 includes a part whose outer diameter is substantially equal to or slightly smaller than the inner diameter of the opening of the protection cover portion 532 on the back end side and a flange portion 544*a* whose outer diameter is equal to the outer diameter R0 of the protection cover portion 532. The inner diameter of the ring-shaped member 544 is smaller than the outer diameter of the one end portion 541*a* of the rod-shaped member 541 and larger than the middle part 541*m*.

The diameter of the coil spring 542 is selected to be larger than the diameter of the middle part 541*m* of the rod-shaped member 541 and smaller than the diameter R0 of the protection cover portion 532 and the other end portion 541*b* of the rod-shaped member 541. Therefore, the coil spring 542 is held at the middle part 541*m* between the ring-shaped member 544 press-fitted to the opening on the back end side of the protection cover portion 532 of the cartridge housing 53 and the other end portion 541*b* of the rod-shaped member 541. In this holding state, the ring-shaped member 544 side on the back end side of the protection cover portion 532 of the cartridge housing 53 and the other end portion 541*b* side of the rod-shaped member 541 are elastically biased and separated from each other by the elastic displacement force of the coil spring 542.

The elastic displacement portion 54 with the configuration described above is attached to the back end side of the protection cover portion 532 when the one end portion 541*a* of the elastic displacement portion 54 is inserted into the protection cover portion 532 from the opening of the protection cover portion 532 on the back end side. In this way, the elastic displacement portion 54 is attached while the middle part 541*m* of the rod-shaped member 541 to which the coil spring 542 is loosely fitted and the other end portion 541*b* are exposed outside the protection cover portion 532.

The outer diameter of the one end portion 541*a* of the rod-shaped member 541 is a diameter smaller than the inner diameter of the protection cover portion 532, and the middle part 541*m* of the rod-shaped member 541 can move in the axial direction against the elastic biasing force of the coil spring 542 with respect to the ring-shaped member 544 fixed to the protection cover portion 532. Therefore, the one end portion 541*a* side of the rod-shaped member 541 of the elastic displacement portion 54 can move toward the pen tip in the hollow portion of the protection cover portion 532 against the elastic force of the coil spring 542.

In the embodiment, the elastic displacement portion 54 is attached to the back end side of the cartridge housing 53 in this way to form the writing input cartridge 5 as illustrated in FIG. 4A. When a load equal to or greater than a predetermined value that contracts the length of the writing input cartridge 5 in the axial direction against the elastic displacement force of the coil spring 542 of the elastic displacement portion 54 is applied to the writing input cartridge 5, the coil spring 542 of the elastic displacement portion 54 is elastically contracted. The one end portion 541*a* side of the rod-shaped member 541 moves toward the pen tip in the protection cover portion 532, and the one end portion 541*a* side is displaced in such a manner as to contract the length of the writing input cartridge 5 in the axial direction. When there is no more load, the coil spring 542 is expanded and elastically restored, and the length of the writing input cartridge 5 in the axial direction returns to the original state of FIG. 4A.

In this case, the elastic property of the coil spring 542 is insensitive to the load in the range of the pen pressure applied to the front end portion 51*a* of the core body 51 during the use of the electronic pen 1. That is, the elastic property of the coil spring 542 is insensitive to the load in the range of the pen pressure value detected by the pen pressure detection portion 55. The elastic property of the coil spring 542 is such that the coil spring 542 is expanded and contracted as described above when, during the use of the electronic pen 1, the user performs a knock operation to apply a load larger than the load in the range of the pen pressure applied to the front end portion 51*a* of the core body 51 or when an impact load or the like larger than the load in the range of the pen pressure is applied to the electronic pen 1. The expansion and the contraction caused by the impact load in the latter case indicates that the elastic displacement portion 54 plays a role of what is generally called a shock absorber for the writing input cartridge 5.

Note that the elastic displacement portion 54 can be detached from the protection cover portion 532 of the writing input cartridge 5 as is apparent from the configuration described above.

Note that the elastic property of the coil spring 47 as an elastic return member in the knock cam mechanism portion is similar to the elastic property used in a typical knock-type ballpoint pen or the like, and the elastic force of the coil spring 47 is smaller than the elastic force of the coil spring 542 of the elastic displacement portion 54.

In the writing input cartridge 5 of the embodiment, a projection portion 57 projecting in the direction crossing the axial direction, which is a direction orthogonal to the axial direction in the example, from the outer circumference side surface of the cartridge housing 53 is provided at a predetermined position between one end side of the cartridge housing 53 in the axial direction and another end side of the cartridge housing 53 in the axial direction as illustrated in FIGS. 4A and 5. In the embodiment, the projection portion 57 is provided on the holder portion 531 on the pen tip side of the cartridge housing 53. In the example, the projection portion 57 protrudes as a flange portion with a predetermined thickness, from the outer circumference side surface of the holder portion 531. The projection portion 57 may be integrated with the outer casing of the holder portion 531 or may be separated from the holder portion 531.

In this case, the projection portion 57 may be formed to project (protrude) in the direction orthogonal to the axial direction throughout the entire outer circumference portion of the holder portion 531. However, in the embodiment, the projection portion 57 has a shape projecting in the direction orthogonal to the axial direction from positions separated from each other by 180 degrees corresponding to the length of the diameter of the holder portion 531 as illustrated in FIG. 5. The front end portion of the projection portion 57 in the axial direction has an arc shape corresponding to the shape along the inner wall surface of the pen tip side housing portion 21 of the pen housing 2.

Such a shape can reduce as much as possible the contact part of the front end portion of the projection portion 57 in the axial direction and the inner wall surface of the pen tip side housing portion 21 of the pen housing 2 to allow the writing input cartridge 5 to easily move in the axial direction in the pen housing 2 during the knock operation or when there is an impact load.

Since the projection portion 57 is formed in the shape described above, a space is formed between the projection portion 57 and the inner wall surface of the pen tip side housing portion 21 on the side in a direction crossing the projection direction at the position of the projection portion 57. In the example, protrusion portions and locking pieces for preventing the writing input cartridge 5 from rotating about the axial direction in the pen housing 2 are provided in the space at the position of the projection portion 57. Through the space, an end portion (lead portion) of the coil 521 passes through toward the holder portion 531 without coming into contact with the inner wall of the pen tip side housing portion 21. Note that a recess groove may be provided on the projection portion 57, and the end portion of the coil 521 may be led toward the holder portion 531 without protruding outside from the recess groove part.

FIG. 6A is a cross-sectional view of the pen tip side of the pen tip side housing portion 21 of the pen housing 2. FIG. 6B depicts the pen tip side of the writing input cartridge 5. In the embodiment, formed on the inner wall surface of the pen tip side housing portion 21 is a stopper portion, which is a step portion 21*s* in the example, engaged with the projection portion 57 provided on the cartridge housing 53 of the writing input cartridge 5, to prevent the writing input cartridge 5 from further moving toward the pen tip of the pen tip side housing portion 21 of the pen housing 2, as illustrated in FIG. 6A.

In the electronic pen 1, the ease of the input operation performed by the user, for example, is taken into account to set in advance the length in the axial direction (defined protrusion length Lp) by which the pen tip side of the writing input cartridge 5 should protrude outside from the opening (pen tip side opening of the pen tip side housing portion 21) 2*a* of the pen housing 2 during the writing on the input surface of the position detection sensor.

In the embodiment, the projection portion 57 provided on the cartridge housing 53 of the writing input cartridge 5 and the step portion 21*s* formed on the inner wall surface of the pen tip side housing portion 21 of the pen housing 2 are formed by setting their positions in the axial direction such that they are engaged with each other when the protrusion length of the pen tip side of the writing input cartridge 5 from the opening 2*a* of the pen housing 2 is the defined protrusion length Lp.

The relation between the formation position of the projection portion 57 provided on the cartridge housing 53 of the writing input cartridge 5 in the embodiment and the formation position of the step portion 21*s* formed on the inner wall surface of the pen tip side housing portion 21 will further be described with reference to FIGS. 6A and 6B.

In the writing input cartridge 5, the signal transmission member 52 including the ferrite core 522 around which the coil 521 is wound is attached to the holder portion 531 on the pen tip side of the cartridge housing 53 with the outer diameter R0, and the core body 51 is further inserted through the through hole 522*a* of the ferrite core 522 and fitted to the pen pressure detection portion 55 (not illustrated in FIG. 6B) arranged on the holder portion 531, as illustrated in FIG. 6B.

In the example, an outer diameter R1 of the ferrite core 522 is a diameter smaller than the outer diameter R0 of the cartridge housing 53 as illustrated in FIG. 6B. An outer diameter R2 of the part where the coil 521 is wound around the ferrite core 522 is equal to or smaller than the outer diameter R0 of the cartridge housing 53. That is, the writing input cartridge 5 is formed to have a relation of $R1<R2\leq R0$.

As illustrated in FIG. 6A, a diameter R3 of the opening 2*a* of the pen tip side housing portion 21 on the pen tip side is a diameter slightly larger than the outer diameter R1 of the ferrite core 522 of the writing input cartridge 5. Not only the core body 51 but also a part of the ferrite core 522 is exposed outside from the opening 2*a* during the use of the electronic pen 1 in the example.

As illustrated in FIG. 6B, the length in the axial direction from the front end of the front end portion 51*a* of the core body 51 to a part of the ferrite core 522 on the pen tip side is set to be the defined protrusion length Lp. As illustrated in FIG. 6B, the length in the axial direction from the front end of the front end portion 51*a* of the core body 51 to the end surface on the pen tip side of the projection portion 57 of the holder portion 531 of the cartridge housing 53 of the writing input cartridge 5 is Lz.

Meanwhile, as illustrated in FIG. 6A, an inner diameter R4 of the hollow portion of the pen tip portion communicating with the opening 2*a* of the pen tip side housing portion 21 is slightly larger than the outer diameter R0 of the writing input cartridge 5, and this prevents the coil 521 wound around the ferrite core 522 included in the signal transmission member 52 from coming into contact with the inner wall surface of the pen tip side housing portion 21 in the hollow portion with the inner diameter R4. In the case of the example, the part of a hollow portion 21*e* of the pen tip side housing portion 21 from the part with the inner diameter R4 to the opening 2*a* with the diameter R3 is tapered, gradually becoming narrower as illustrated in FIG. 6A. Therefore, if the part of the coil 521 of the writing input cartridge 5 is positioned at the tapered part, the coil 521 may come into contact with the inner wall surface of the tapered part.

In the example, the length in the axial direction from the position separated by the defined protrusion length Lp toward the back end from the front end of the core body 51 of the writing input cartridge 5 to the end portion on the pen tip side of the winding part of the coil 521 is equal to a length L2 from the front end of the opening 2*a* of the pen tip side housing portion 21 to the pen tip side end portion with the inner diameter R4 through the tapered portion as illustrated in FIGS. 6A and 6B.

As illustrated in FIGS. 6A and 6B, the inner diameter of the hollow portion 21*e* of the pen tip side housing portion 21 on the back end side from the position at a length L1 ($=Lz-Lp$) equal to $Lz-Lp$ from the front end of the opening 2*a* of the pen tip side housing portion 21 is a diameter R5 larger than the inner diameter R4 and the outer diameter R0. As a result, the step portion 21*s* is formed on the position at the length L1 ($=Lz-Lp$) equal to $Lz-Lp$ from the front end of the opening 2*a* of the pen tip side housing portion 21.

Therefore, the length of the part with the diameter R4 on the pen tip side is a length L3 ($=L1-L2$) in the pen tip side housing portion 21 of the electronic pen 1 of the embodiment as illustrated in FIG. 6A. When the pen tip side of the writing input cartridge 5 protrudes by the defined protrusion length Lp, the coil 521 of the writing input cartridge 5 illustrated in FIG. 6B is positioned at the part of the hollow portion 21*e* of the pen tip side housing portion 21 with the diameter R4 and the length L3. Therefore, the coil 521 does not come into contact with the inner wall of the hollow portion 21*e* of the pen tip side housing portion 21. Thus, an unnecessary load caused by contact is not applied to the coil 521, and the signal transmission member 52 allows the coil 521 to be coupled to the position detection sensor with a stable magnetic flux.

The diameter of the arc portion on the front end in the protrusion direction of the projection portion 57 formed on the holder portion 531 of the cartridge housing 53 of the writing input cartridge 5 is a diameter R6 larger than the inner diameter R4 of the hollow portion on the pen tip side of the position of the step portion 21*s* of the pen tip side housing portion 21 and substantially equal to or slightly smaller than the inner diameter R5 of the pen tip side housing portion 21. That is, the writing input cartridge 5 is formed to have a relation of $R4<R6\leq R5$.

In this way, the projection portion 57 of the writing input cartridge 5 is engaged with the step portion 21*s* on the inner wall surface of the pen tip side housing portion 21 to thereby prevent the writing input cartridge 5 from moving toward the pen tip in the hollow portion of the pen housing 2. In this state, the core body 51 and a part of the ferrite core 522 on the pen tip side of the writing input cartridge 5 can protrude outside from the opening 2*a* of the pen tip side housing portion 21 of the pen housing 2 by the defined protrusion length Lp.

Therefore, the state of the electronic pen 1 always protruding outside from the opening 2*a* by the defined protrusion length Lp is maintained on the pen tip side, and this can prevent the coil 521 as an example of a part that should not come into contact with the inner wall surface of the pen tip side housing portion 21 on the pen tip side of the writing input cartridge 5 from coming into contact with the inner wall surface of the pen tip side housing portion 21.

Moreover, the diameter of the arc-shaped portion on the front end in the protrusion direction of the projection portion 57 provided on the writing input cartridge 5 is the diameter R6 substantially equal to or slightly smaller than the inner diameter R5 of the pen tip side housing portion 21 in the embodiment, and the displacement of the writing input cartridge 5 in the direction orthogonal to the axial direction is also suppressed. Therefore, this also can prevent the coil 521 as an example of the part that should not come into contact with the inner wall surface of the pen tip side housing portion 21 on the pen tip side of the writing input cartridge 5 from coming into contact with the inner wall surface of the pen tip side housing portion 21.

In the electronic pen 1 of the embodiment, the projection portion 57 of the writing input cartridge 5 is engaged with the step portion 21*s* on the inner wall surface of the pen tip side housing portion 21. Therefore, the pen tip side of the writing input cartridge 5 does not protrude outside from the opening 2*a* of the pen tip side housing portion 21 by the length equal to or greater than the defined protrusion length Lp, and the protrusion by the length equal to or greater than the defined protrusion length Lp during the knock operation is also prevented. This also can prevent the coil 521 as an example of the part that should not come into contact with the inner wall surface of the pen tip side housing portion 21 on the pen tip side of the writing input cartridge 5 from coming into contact with the inner wall surface of the pen tip side housing portion 21.

Configuration Example of Deletion Cartridge 6

FIG. 4C illustrates a configuration example of the deletion cartridge 6 in the electronic pen 1 of the embodiment. The deletion cartridge 6 of the example includes components similar to the writing input cartridge 5 except that the elastic displacement portion 54 on the back end side and the projection portion 57 are removed.

The deletion cartridge 6 in the electronic pen 1 of the embodiment will be described by providing reference signs of 60*s* to parts similar to the writing input cartridge 5. The deletion cartridge 6 includes a core body 61, a signal transmission member 62, and a cartridge housing 63 as illustrated in FIG. 4C. The cartridge housing 63 includes a holder portion 631 that holds a pen pressure detection portion 65 and that also holds a circuit board 66 provided with an electronic circuit and a protection cover portion 632 with a function of housing and protecting the pen pressure detection portion 65 and the circuit board 66 held by the holder portion 631.

The signal transmission member 62 includes a coil 621 included in a resonant circuit that uses the electromagnetic resonance system to transmit and receive signals to and from the position detection apparatus and a magnetic core, which is a ferrite core 622 in the example, around which the coil 621 is wound. A through hole 622*a* is formed on the ferrite core 622 in the axial direction. The core body 61 is inserted into the through hole 622*a* and fitted to the pen pressure detection portion 65. In this case, the front end portion 61*a* of the core body 61 as a pen tip protrudes more than the ferrite core 622.

The configurations of the components of the deletion cartridge 6 provided with the reference signs of 60*s* are similar to the configurations in the writing input cartridge 5 described with use of the reference signs of 50*s*, and the configurations will not be described in detail here.

Assembly Procedure of Electronic Pen Body Portion Module 3 of Embodiment

The electronic pen body portion module 3 of the embodiment with the configuration described above can be assembled by sequentially compiling the components. An assembly procedure of the electronic pen body portion module 3 of the embodiment will be described with reference to FIGS. 7A to 11B.

Figures 7A, 7B:
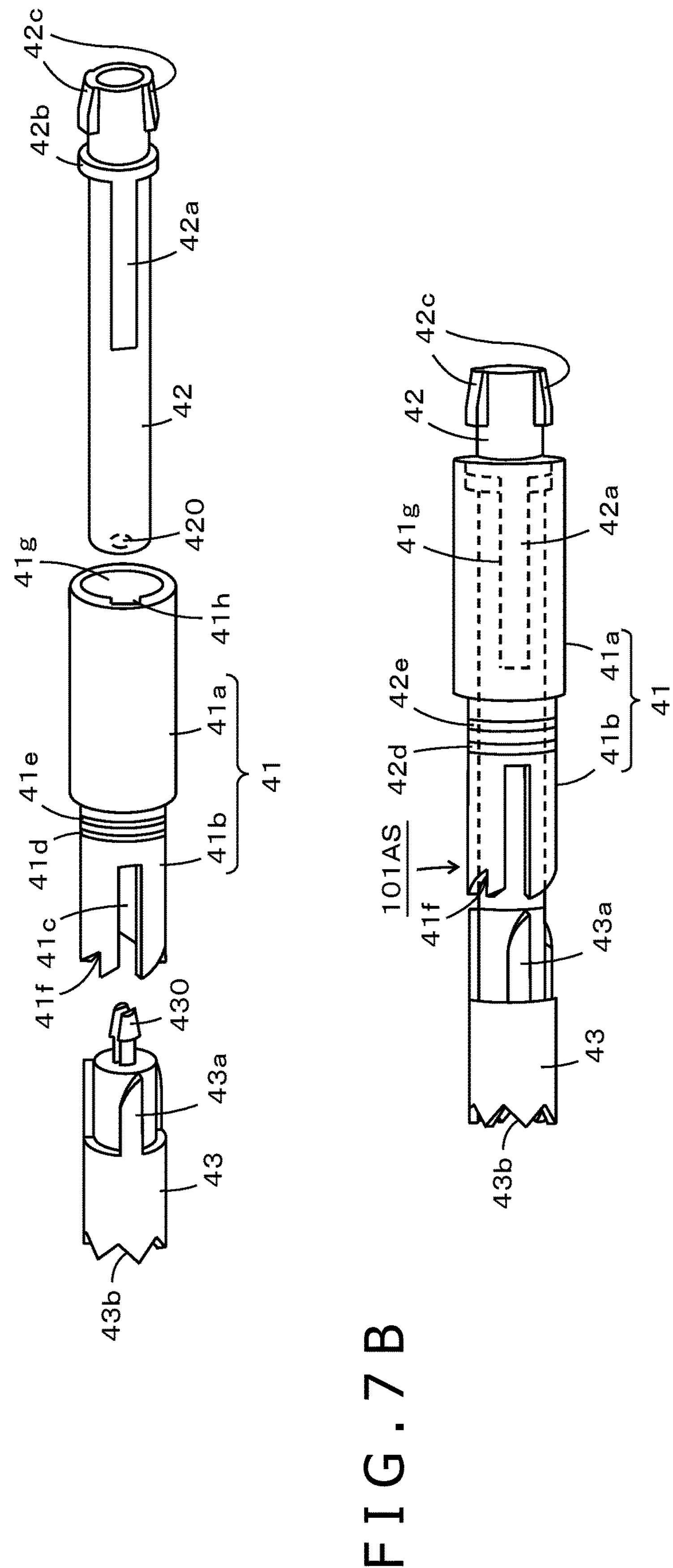
FIGS. 7A and 7B are diagrams for describing an assembly procedure of the electronic pen body portion module included in the electronic pen according to the embodiment of the disclosure.

As illustrated in FIG. 7A, the knock case portion 41 is set at the center. The shaft portion 42 is arranged on the back end side of the knock case portion 41 in the axial direction, and the front shaft portion 43 is arranged on the pen tip side in the axial direction. The back end side shaft portion 42 is housed in the knock case portion 41 from an opening 41*g* of the knock case portion 41 on the back end side. The coupling protrusion portion 430 of the front shaft portion 43 is fitted to the fitting portion 420 of the back end side shaft portion 42 as described with reference to FIGS. 3A to 3C, to assemble an assembly part 101AS as a main portion of the knock cam mechanism portion as illustrated in FIG. 7B.

In housing the back end side shaft portion 42 in the knock case portion 41 in this case, the position of a recess groove 41*h* exposed to the opening 41*g* side of the knock case portion 41 and formed on the inner wall surface of the knock case portion 41 and the position of the protrusion section 42*a* of the back end side shaft portion 42 are adjusted to house the protrusion section 42*a* in the recess groove 41*h*. The recess groove 41*h* of the knock case portion 41 and the protrusion section 42*a* of the back end side shaft portion 42 are engaged with each other to prevent the back end side shaft portion 42 from rotating with respect to the knock case portion 41.

In the assembly part 101AS of FIG. 7B, the back end side shaft portion 42 can move in the axial direction in the knock case portion 41 while the back end side shaft portion 42 is coupled to the front shaft portion 43. In this case, the length of the recess groove 41*h* of the knock case portion 41 in the axial direction is relatively long, and the back end side shaft portion 42 is configured to move in the axial direction by the length at least corresponding to the stroke in the axial direction during the knock operation while the protrusion section 42*a* is engaged with the recess groove 41*h*.

Figures 8A, 8B, 8C:
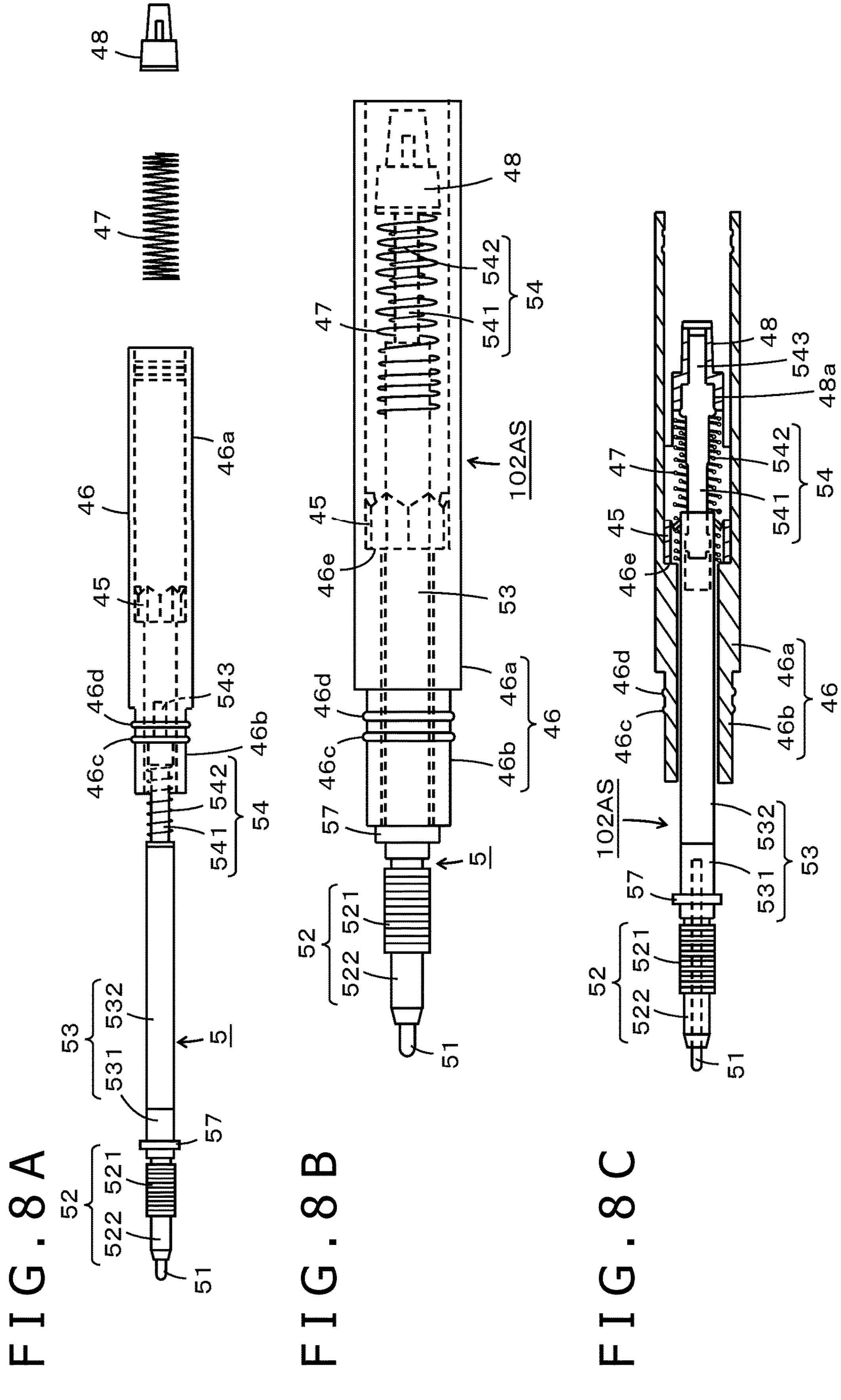
FIGS. 8A to 8C are diagrams for describing the assembly procedure of the electronic pen body portion module included in the electronic pen according to the embodiment of the disclosure.

As illustrated in FIG. 8A, the gear holder portion 46 is set at the center. The writing input cartridge 5 is arranged on the pen tip side of the gear holder portion 46 in the axial direction, and the coil spring 47 and the spacer 48 are arranged on the back end side in the axial direction.

As illustrated in FIG. 8B, the back end side of the writing input cartridge 5 is inserted into the hollow portion of the gear holder portion 46 to insert the ring-shaped gear portion 45. The coil spring 47 is wound around the back end side into which the gear portion 45 is inserted, and the fitting projection portion 543 provided on the end portion of the elastic displacement portion 54 is fitted to a fitting recess portion 48*a* of the spacer 48. A partial cross-sectional view of FIG. 8C illustrates the fitting state of the fitting projection portion 543 of the elastic displacement portion 54 of the writing input cartridge 5 and the spacer 48.

Note that, as illustrated in FIGS. 8A to 8C, ring-shaped protrusion portions 46*c* and 46*d* to be fitted to the recess groove of the pen tip side housing portion 21 are formed on the outer circumference portion of the small diameter portion 46*b* of the gear holder portion 46.

In the state of FIGS. 8A to 8C, the coil spring 47 for elastic return of the knock cam mechanism portion is arranged between the spacer 48 and a step portion 46*e* on the inner wall of the gear holder portion 46 at the part provided with the gear portion 45, in such a manner as to cover the elastic displacement portion 54 of the writing input cartridge 5 and the back end portion of the protection cover portion 532. In this way, formed is an assembly part 102AS in which the writing input cartridge 5 can move in the axial direction in the hollow portion of the gear holder portion 46 but does not fall out to the pen tip side due to the presence of the coil spring 47 and the spacer 48.

Note that the scales of FIGS. 8A, 8B, and 8C are slightly different for the convenience of description. The same is true for the following drawings.

Figures 9A, 9B, 9C:
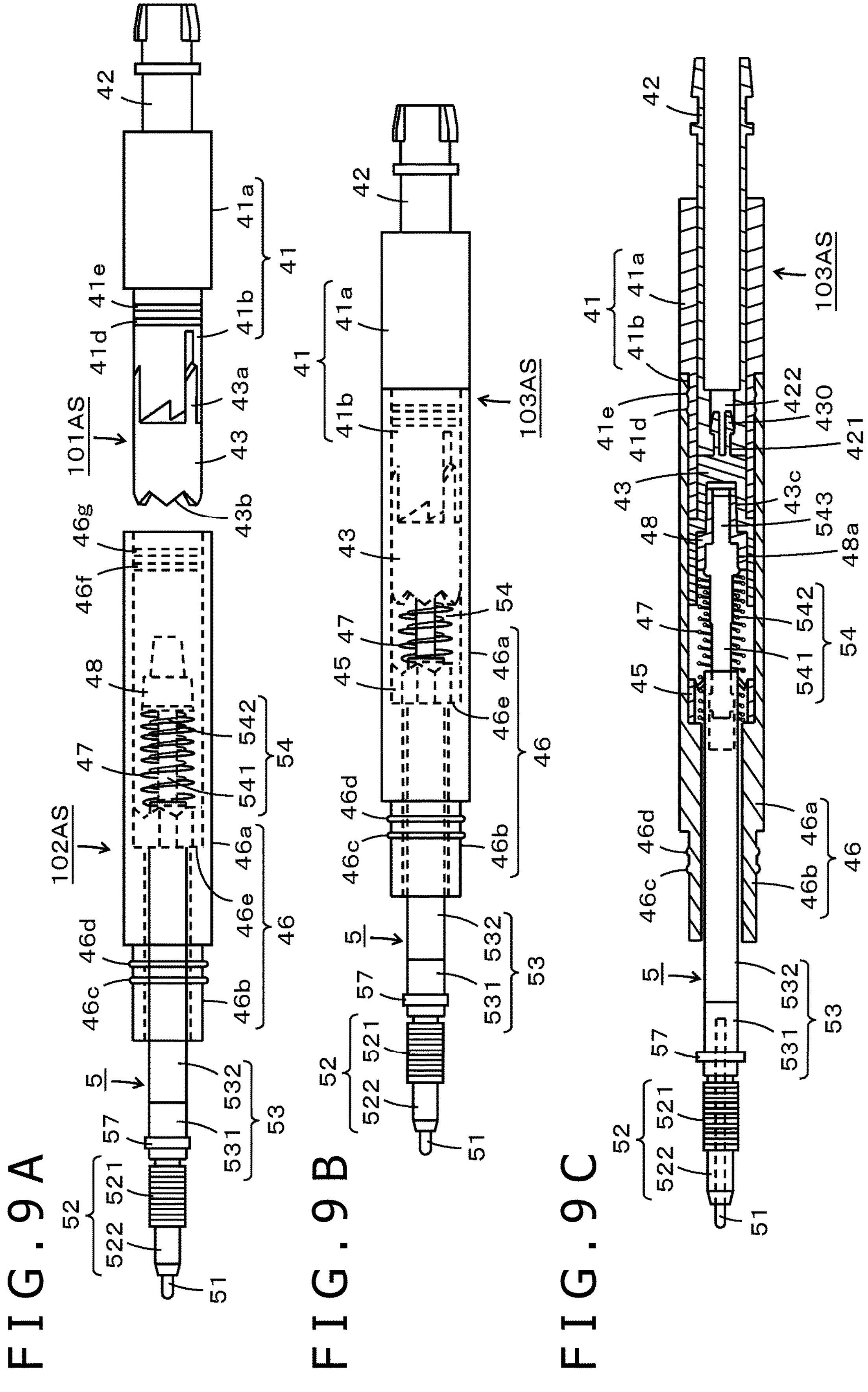
FIGS. 9A to 9C are diagrams for describing the assembly procedure of the electronic pen body portion module included in the electronic pen according to the embodiment of the disclosure.

As illustrated in FIG. 9A, the assembly part 101AS as a main portion of the knock cam mechanism portion illustrated in FIG. 7B is lined up in the axial direction on the back end side of the assembly part 102AS illustrated in FIG. 8B, with the gear portion 43*b* side of the front shaft portion 43 facing the gear holder portion 46 side.

As illustrated in FIG. 9B, the front shaft portion 43 and the small diameter portion 41*b* of the knock case portion 41 of the assembly part 101AS are inserted into the gear holder portion 46, and the ring-shaped protrusion portions 41*d* and 41*e* of the small diameter portion 41*b* and ring-shaped recess grooves 46*f* and 46*g* formed on the inner wall surface of the gear holder portion 46 are fitted to each other to maintain their coupling state. The spacer 48 coupled to the fitting projection portion 543 of the elastic displacement portion 54 of the writing input cartridge 5 of the assembly part 102AS is pushed into and fitted to the fitting recess portion 43*c* (see FIG. 9C) of the small diameter portion of the front shaft portion 43 of the assembly part 101AS to thereby form an assembly part 103AS.

A partial cross-sectional view of FIG. 9C illustrates the fitting state in which the spacer 48 coupled to the fitting projection portion 543 of the elastic displacement portion 54 of the back end portion of the writing input cartridge 5 is fitted to the fitting recess portion 43*c* of the small diameter portion of the front shaft portion 43 in the assembly part 103AS.

Figures 10A, 10B:
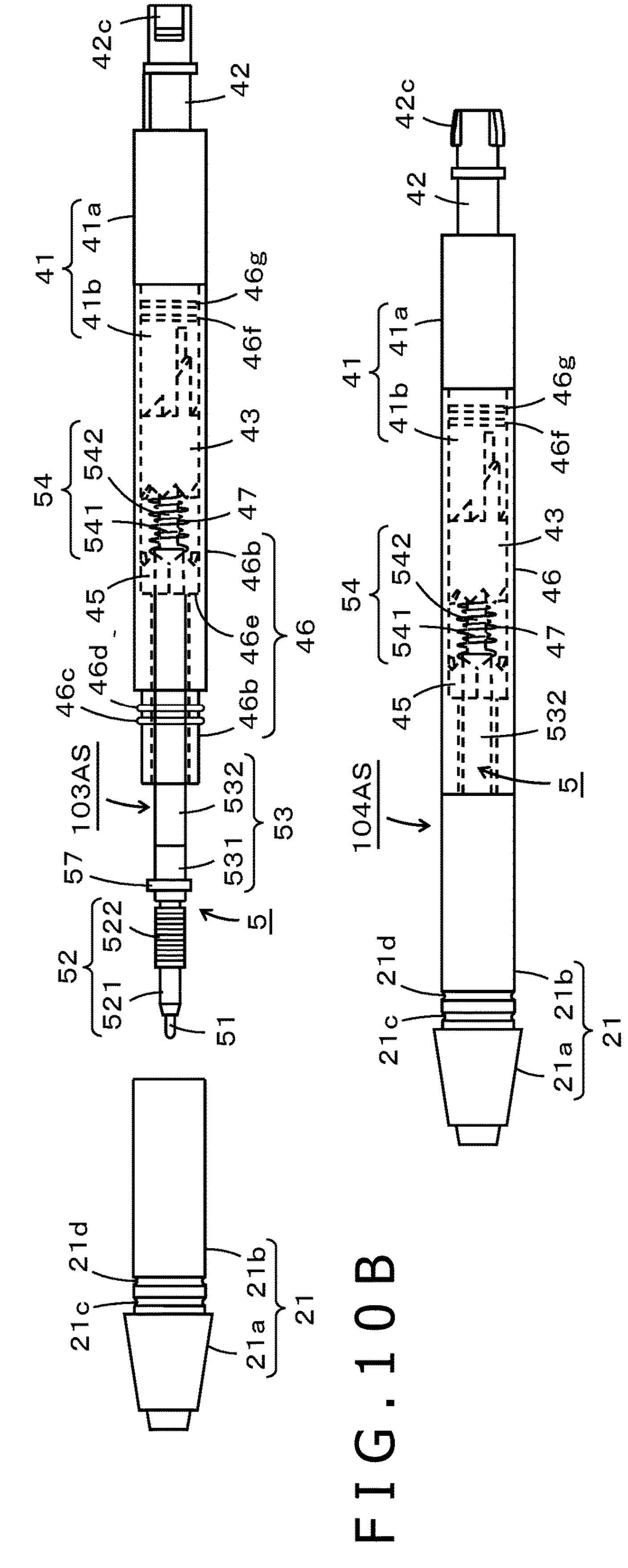
FIGS. 10A and 10B are diagrams for describing the assembly procedure of the electronic pen body portion module included in the electronic pen according to the embodiment of the disclosure.

As illustrated in FIG. 10A, the pen tip side housing portion 21 is arranged on the pen tip side of the assembly part 103AS illustrated in FIG. 9B assembled by coupling the assembly part 101AS and the assembly part 102AS.

As illustrated in FIG. 10B, the pen tip side of the assembly part 103AS is inserted into the pen tip side housing portion 21, and the small diameter portion 46*b* of the gear holder portion 46 is further inserted into the pen tip side housing portion 21. The ring-shaped protrusion portions 46*c* and 46*d* of the small diameter portion 46*b* of the gear holder portion 46 and a ring-shaped recess groove (not illustrated) formed on the inner wall surface of the pen tip side housing portion 21 are fitted to each other to maintain their coupling state and thereby form an assembly part 104AS illustrated in FIG. 10B. The locking state of the ring-shaped protrusion portions 46*c* and 46*d* and the ring-shaped recess groove can be released by pulling the pen tip side housing portion 21 in the direction of separating the pen tip side housing portion 21 from the assembly part 104AS in the axial direction.

Figures 11A, 11B:
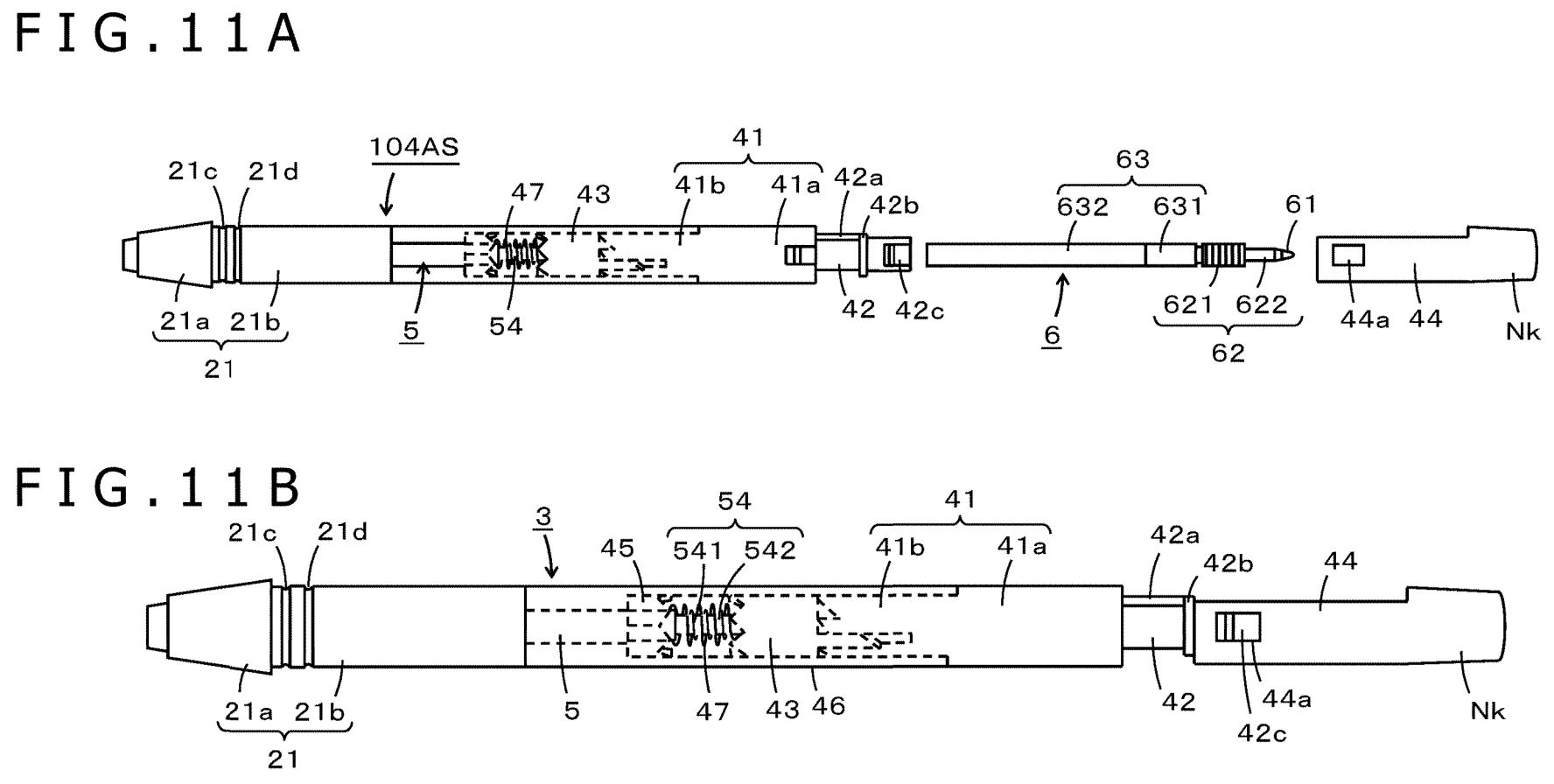

As illustrated in FIG. 11A, the deletion cartridge 6 and the back end cap member 44 are lined up and arranged on the back end side of the assembly part 104AS illustrated in FIG. 10B.

The opposite side of the pen tip side of the deletion cartridge 6 is inserted into the back end side shaft portion 42 of the assembly part 104AS. Subsequently, the back end cap member 44 is placed over the pen tip side of the deletion cartridge 6, and the engagement protrusion portion 42*c* of the back end side shaft portion 42 is fitted into the through window 44*a* of the back end cap member 44 to couple the back end cap member 44 to the back end side shaft portion 42. In this way, the electronic pen body portion module 3 of the embodiment is provided as illustrated in FIG. 11B.

The electronic pen 1 of the embodiment is formed by the back end side housing portion 22 being coupled to the pen tip side housing portion 21 while the back end side of the electronic pen body portion module 3 is housed as illustrated in FIGS. 1A to 1C. The coupling state is maintained by the fitting protrusion portions 22*a* and 22*b* on the inner wall of the back end side housing portion 22 being fitted to the ring-shaped recess grooves 21*c* and 21*d* of the pen tip side housing portion 21. The coupling state of the pen tip side housing portion 21 and the back end side housing portion 22 can be released by pulling them apart to release the fitting of the ring-shaped recess grooves 21*c* and 21*d* of the pen tip side housing portion 21 and the fitting protrusion portions 22*a* and 22*b* on the inner wall of the back end side housing portion 22, and the pen tip side housing portion 21 and the back end side housing portion 22 can be separated from each other.

Note that the back end cap member 44 can be separated from the assembly part 104AS by pulling the back end cap member 44 in the axial direction while releasing the fitting of the through window 44*a* of the back end cap member 44 and the engagement protrusion portion 42*c* of the back end side shaft portion 42.

In this way, the electronic pen 1 of the embodiment can be manufactured by sequentially assembling, in the axial direction, the parts for providing the electronic pen 1. An adhesive is not used, and the electronic pen 1 can be disassembled in a procedure opposite the procedure described above. Therefore, when the writing input cartridge 5, the deletion cartridge 6, or another part is damaged or deteriorated over time, the electronic pen 1 can be repaired by replacing only the damaged or deteriorated part. That is, the entire electronic pen 1 does not have to be replaced when there is a defect in one part, and this is economical.

Type of Usage of Electronic Pen 1 of Embodiment and Action During Knock Operation When the writing input cartridge 5 is used to perform writing input in the electronic pen 1 of the embodiment, the knock operation portion Nk of the back end portion of the back end cap member 44 is pressed (knocked) to protrude the pen tip of the writing input cartridge 5 from the opening 2*a* of the pen tip side housing portion 21 of the pen housing 2, as with a knock-type ballpoint pen or the like that is a writing tool. When the knock operation is further performed from the state in which the pen tip of the writing input cartridge 5 protrudes from the opening 2*a* of the pen tip side housing portion 21 of the pen housing 2, the pen tip of the writing input cartridge 5 returns to the original state in which the pen tip is housed and protected in the pen tip side housing portion 21.

However, unlike in the knock-type ballpoint pen or the like that is a writing tool, not only the coil spring 47 as a return elastic member but also the coil spring 542 of the elastic displacement portion 54 of the writing input cartridge 5 functions during the knock operation in the electronic pen 1 of the embodiment. The projection portion 57 of the writing input cartridge 5 and the step portion 21*s* in the pen tip side housing portion 21 are also involved during the knock operation.

Note that, in the electronic pen 1 of the embodiment, the knock operation can be performed in the electronic pen body portion module 3 not provided with the back end side housing portion 22. Therefore, the action of the electronic pen body portion module 3 will be described below.

Figures 12A, 12B:
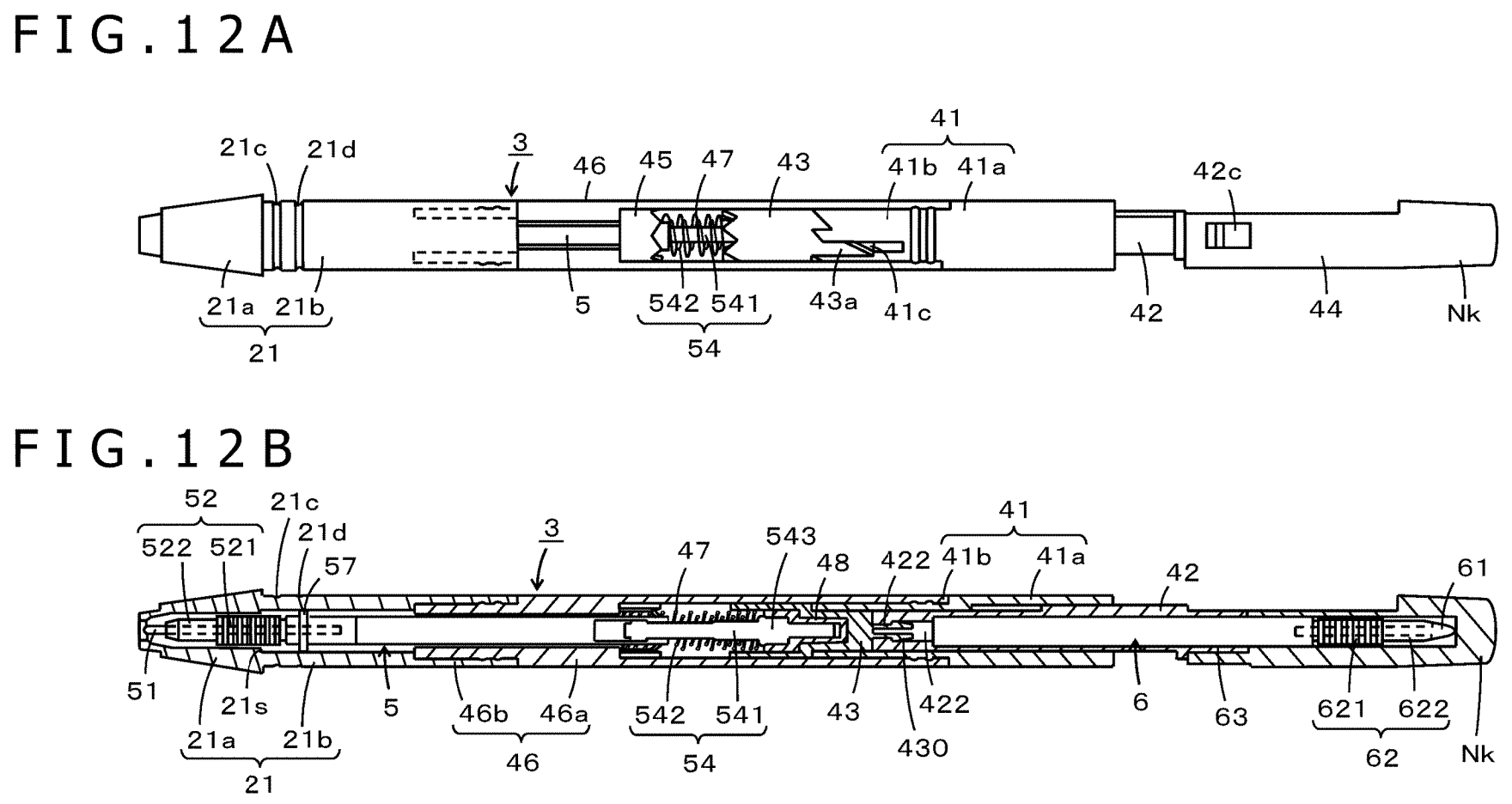

FIG. 12A illustrates a state in which the pen tip side of the writing input cartridge 5 is housed in the pen tip side housing portion 21 in the electronic pen body portion module 3 of the electronic pen 1 of the embodiment. FIG. 12B illustrates a longitudinal section of this state.

As illustrated in FIG. 12B, the pen tip side of the writing input cartridge 5 is housed in the pen tip side housing portion 21. In this state, the coil spring 47 for elastic return and the elastic displacement portion 54 are in the initial state in which they are expanded the most. The projection portion 57 of the writing input cartridge 5 and the step portion 21*s* on the inner wall surface of the pen tip side housing portion 21 are separated from each other in the axial direction.

Figures 13A, 13B:
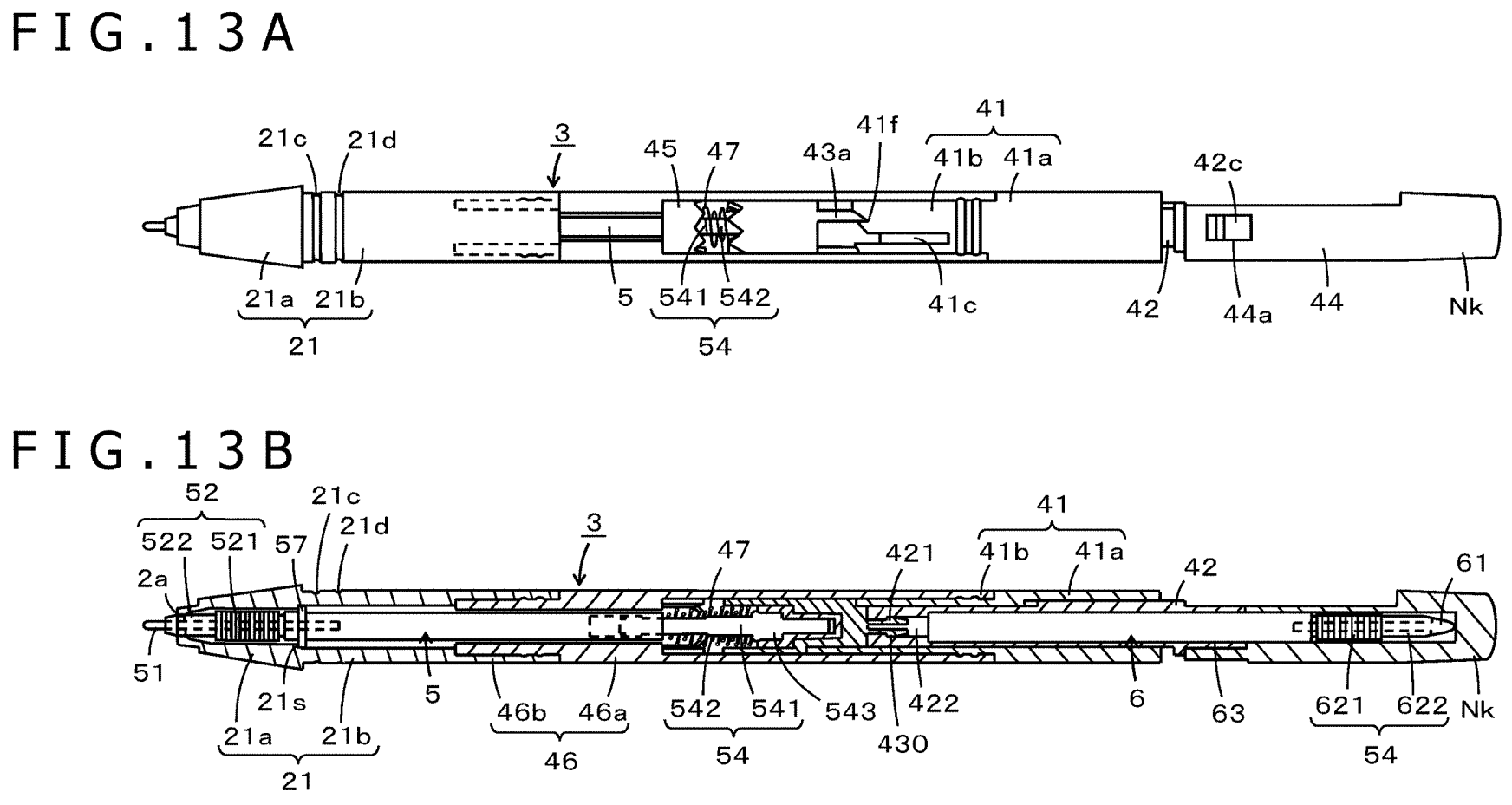

FIG. 13A illustrates a state in which the pen tip side of the writing input cartridge 5 protrudes outside from the opening 2*a* of the pen tip side housing portion 21 in the electronic pen body portion module 3 of the electronic pen 1 of the embodiment. FIG. 13B illustrates a longitudinal section of this state.

In this case, the blade portion 43*a* of the front shaft portion 43 of the electronic pen body portion module 3 is engaged with the locking portion 41*f* of the small diameter portion 41*b* of the knock case portion 41 as illustrated in FIG. 13A, and the pen tip side of the writing input cartridge 5 is held while the pen tip side protrudes from the opening 2*a* of the pen tip side housing portion 21 as illustrated in FIG. 13B. In this state, the elastic return coil spring 47 is elastically displaced. Meanwhile, the elastic displacement portion 54 is temporarily elastically displaced during the knock operation in which the pen tip side of the writing input cartridge 5 protrudes from the opening 2*a* of the pen tip side housing portion 21. However, the elastic displacement portion 54 returns to the original length when the knock operation of FIGS. 13A and 13B is completed.

In this state, the projection portion 57 of the writing input cartridge 5 and the step portion 21*s* on the inner wall surface of the pen tip side housing portion 21 are engaged with each other as illustrated in FIG. 13B, and the amount of protrusion by which the pen tip side of the writing input cartridge 5 protrudes from the opening 2*a* of the pen tip side housing portion 21 is the defined protrusion length Lp that is an appropriate amount set in advance.

The front shaft portion 43 and the back end side shaft portion 42 are coupled to each other in the embodiment, and the back end cap member 44 is pushed and locked in the state in which the pen tip side of the writing input cartridge 5 protrudes as illustrated in FIG. 13B. Therefore, when the back end cap member 44 side is directed toward the position detection sensor to use the deletion cartridge 6 in this state, the knock operation portion Nk does not become free, unlike in the knock-type ballpoint pen, and the usability in instructing the deletion is excellent.

Moreover, a large load that contracts the coil spring 542 of the elastic displacement portion 54 of the back end portion of the writing input cartridge 5 needs to be applied to perform the knock operation from the state of FIG. 13B and house the pen tip side of the writing input cartridge 5 again in the pen tip side housing portion 21 in the electronic pen 1 of the embodiment as described later. Therefore, a knock mechanism is not activated by the pen pressure applied when the deletion position is indicated by the deletion cartridge 6. Also in this regard, the usability in the deletion instruction using the deletion cartridge 6 is excellent.

The action on the pen tip side during the knock operation of the electronic pen body portion module 3 of the electronic pen 1 according to the embodiment will further be described in comparison with the action on the pen tip side of a conventional knock-type electronic pen 1PR.

Figures 14A, 14B, 14C, 14D, 14E, 14F:
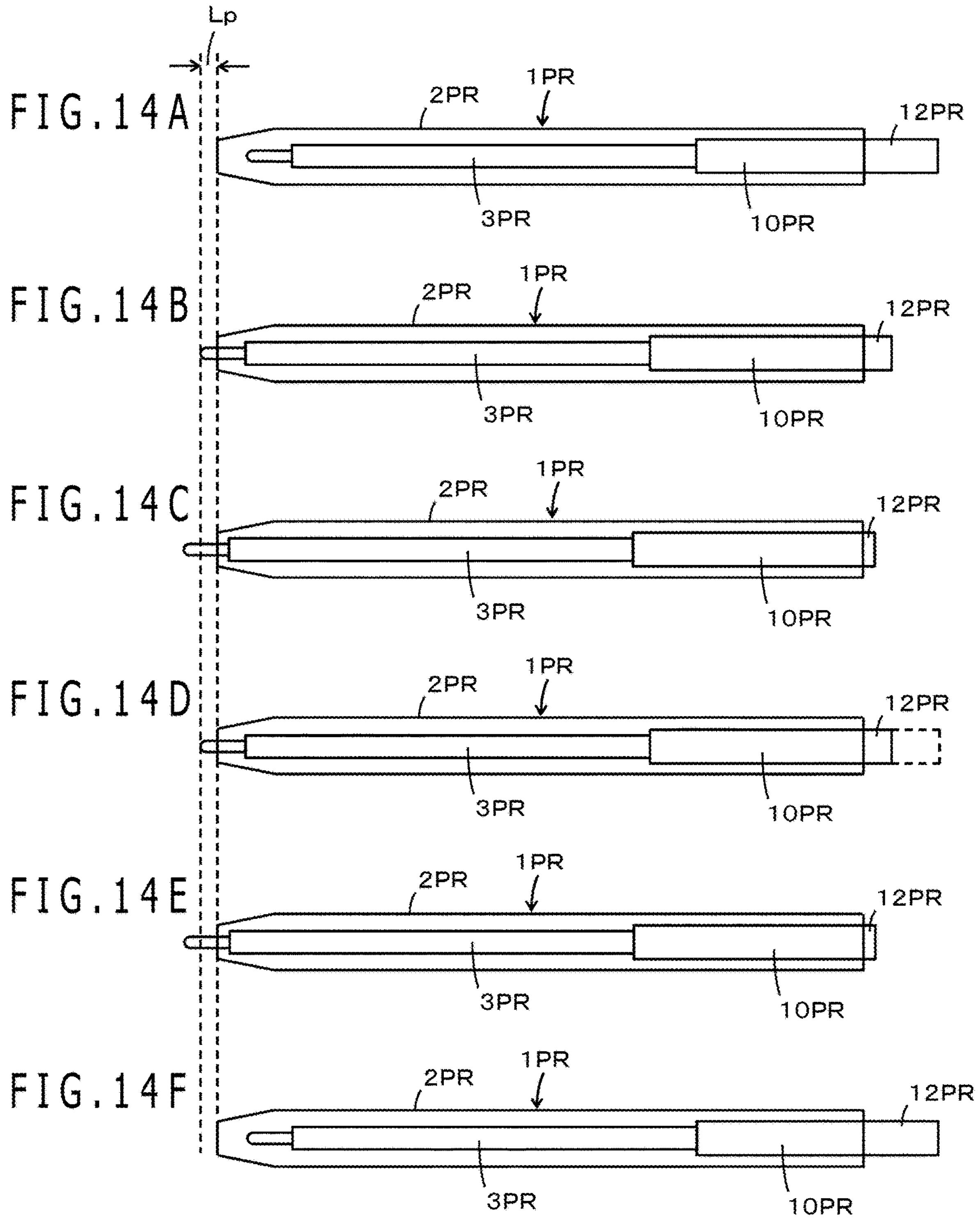
FIGS. 14A to 14F are diagrams for describing an action of the pen tip side during a knock operation in an example of a conventional knock-type electronic pen.

FIGS. 14A to 14F are diagrams for describing the action on the pen tip side of an electronic pen body portion 3PR during the knock operation of the conventional knock-type electronic pen 1PR. FIG. 14A illustrates a non-delivered state in which the pen tip side of the electronic pen body portion 3PR is housed in a pen housing 2PR. FIG. 14B illustrates a state in which a user of the electronic pen 1PR presses a knock rod 12PR of a knock cam mechanism portion 10PR from the state of FIG. 14A to protrude the pen tip side of the electronic pen body portion 3PR from the opening of the pen housing 2PR by the defined protrusion length Lp.

In the conventional knock-type electronic pen 1PR, the delivery operation of the pen tip portion of the electronic pen body portion 3PR is not completed in the state of FIG. 14B. When the press operation of the knock rod 12PR is stopped, the electronic pen body portion 3PR returns to the non-delivered state of FIG. 14A due to the elastic displacement force of the return spring (not illustrated in FIGS. 14A to 14F) of the knock cam mechanism portion 10PR.

The user further pushes the knock rod 12PR from the state of FIG. 14B to protrude the pen tip portion of the electronic pen body portion 3PR from the opening of the pen housing 2PR by equal to or greater than the defined protrusion length Lp as illustrated in FIG. 14C. Consequently, the rotor portion of the knock cam mechanism portion 10PR rotates, and the knock cam mechanism portion 10PR is locked while the pen tip portion of the electronic pen body portion 3PR protrudes from the opening of the pen housing 2A by the defined protrusion length Lp as illustrated in FIG. 14D. The delivery operation is thus completed.

The knock rod 12PR is further pressed from the use state of the electronic pen 1PR in which the pen tip portion is delivered, by the defined protrusion length Lp of FIG. 14D, and the pen tip portion of the electronic pen body portion 3PR protrudes from the opening of the pen housing 2PR again by equal to or greater than the defined protrusion length Lp as illustrated in FIG. 14E. The rotor portion of the knock cam mechanism portion 10PR rotates, and the locking state of delivery is released. The electronic pen body portion 3PR returns to the non-delivered state in which the pen tip side of the electronic pen body portion 3PR illustrated in FIG. 14A is housed in the pen housing 2PR as illustrated in FIG. 14F, due to the elastic displacement force of the return spring (not illustrated in FIGS. 14A to 14F, corresponding to the coil spring 47) of the knock cam mechanism portion 10PR.

In this way, in the case of the conventional knock-type electronic pen 1PR, the electronic pen body portion 3PR needs to be moved toward the opening of the pen housing 2PR such that the pen tip of the electronic pen body portion 3PR protrudes by a protrusion length larger than the defined protrusion length Lp as illustrated in FIGS. 14C and 14E. In this state, the coil of the signal transmission member as an example of the part that should not come into contact with the inner wall surface of the pen housing 2 on the pen tip side of the electronic pen body portion 3PR may come into contact with the inner wall surface of the pen housing 2PR due to many years of use.

When, for example, a position indicator for deletion is arranged on the knock rod 12PR of the knock cam mechanism portion 10PR, the knock rod 12PR side is pressed against the position detection sensor to use the position indicator for deletion in the use state of the electronic pen 1PR in which the pen tip portion is delivered by the defined protrusion length Lp as in FIG. 14D. In this case, the knock operation of the knock cam mechanism portion 10PR is performed by the pressure (load) of pressing, and there is a problem that the usability is poor. Further, the knock rod 12PR and the rotor portion of the knock cam mechanism portion 10PR are not coupled to each other in general. Therefore, the knock rod 12PR freely goes back and forth between the position indicated by a dotted line and the position indicated by a solid line in FIG. 14D, and the usability is poor.

The action of the pen tip side of the writing input cartridge 5 and the action of the knock cam mechanism portion during the knock operation of the electronic pen 1 of the embodiment will be described with reference to FIGS. 15A to 16C.

Figures 15A, 15B, 15C:
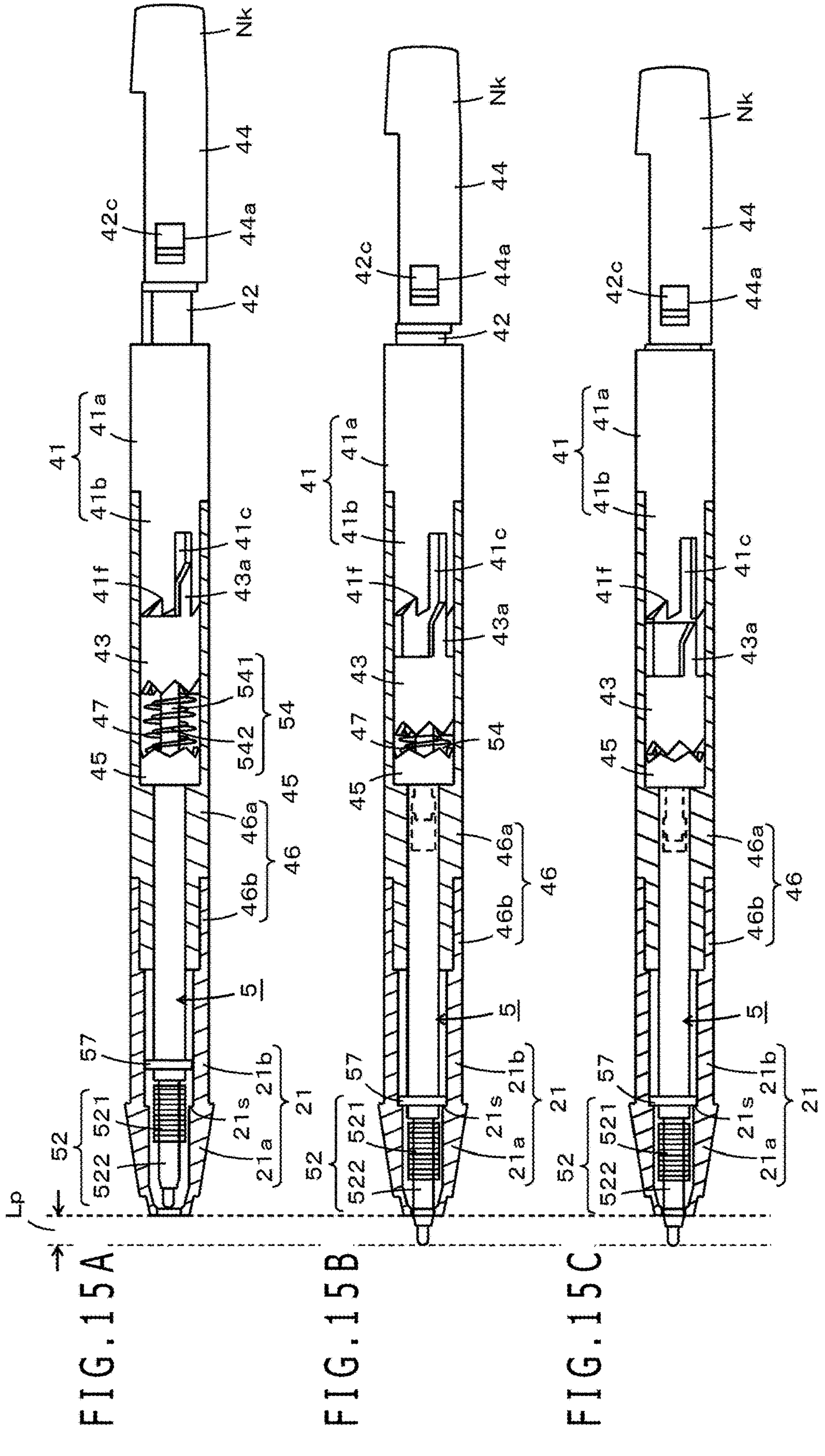
FIGS. 15A to 15C are diagrams for describing an action of a knock cam mechanism portion and an action of the pen tip side during a knock operation of the electronic pen body portion module included in the electronic pen according to the embodiment of the disclosure.

FIG. 15A illustrates a non-delivered state in which the pen tip side of the writing input cartridge 5 is housed in the pen tip side housing portion 21 of the pen housing 2 of the electronic pen body portion module 3. In this state, the step portion 21*s* of the pen tip side housing portion 21 and the projection portion 57 of the writing input cartridge 5 are separated from each other in the axial direction and not engaged with each other.

The user of the electronic pen 1 presses the knock operation portion Nk of the back end portion of the back end cap member 44 from the state of FIG. 15A against the elastic force of the coil spring 47 as a return elastic member of the knock cam mechanism portion, and the pen tip side of the writing input cartridge 5 protrudes from the opening 2*a* of the pen tip side housing portion 21 by the defined protrusion length Lp as illustrated in FIG. 15B. The step portion 21*s* of the pen tip side housing portion 21 and the projection portion 57 of the writing input cartridge 5 are engaged with each other, and the pen tip side of the writing input cartridge 5 does not move more than that in the direction of protrusion from the opening 2*a* in the pen tip side housing portion 21.

However, the delivery operation of the pen tip portion of the writing input cartridge 5 is not completed in the state of FIG. 15B, and the blade portion 43*a* of the front shaft portion 43 included in the rotor portion has not completely got out of the groove portion 41*c* of the small diameter portion 41*b* of the knock case portion 41. When the press operation in the knock operation portion Nk is stopped, the writing input cartridge 5 returns to the non-delivered state of FIG. 15A due to the elastic displacement force of the coil spring 47 for return.

When the user applies a large pressure (load) to the knock operation portion Nk against the elastic displacement force of the coil spring 542 of the elastic displacement portion 54 of the back end portion of the writing input cartridge 5 from the state of FIG. 15B to push the back end cap member 44 toward the pen tip, the protrusion length of the writing input cartridge 5 from the opening 2*a* on the pen tip side remains to be the defined protrusion length Lp, but the elastic displacement portion 54 on the back end side of the writing input cartridge 5 contracts in the axial direction as illustrated in FIG. 15C. Accordingly, the front shaft portion 43 included in the rotor portion moves in the axial direction, and the blade portion 43*a* gets out of the groove portion 41*c* of the small diameter portion 41*b* of the knock case portion 41 as illustrated in FIG. 15C. The front shaft portion 43 and the gear portion 45 start to be engaged with each other, and the force of rotation starts to be applied to the front shaft portion 43.

Figures 16A, 16B, 16C:
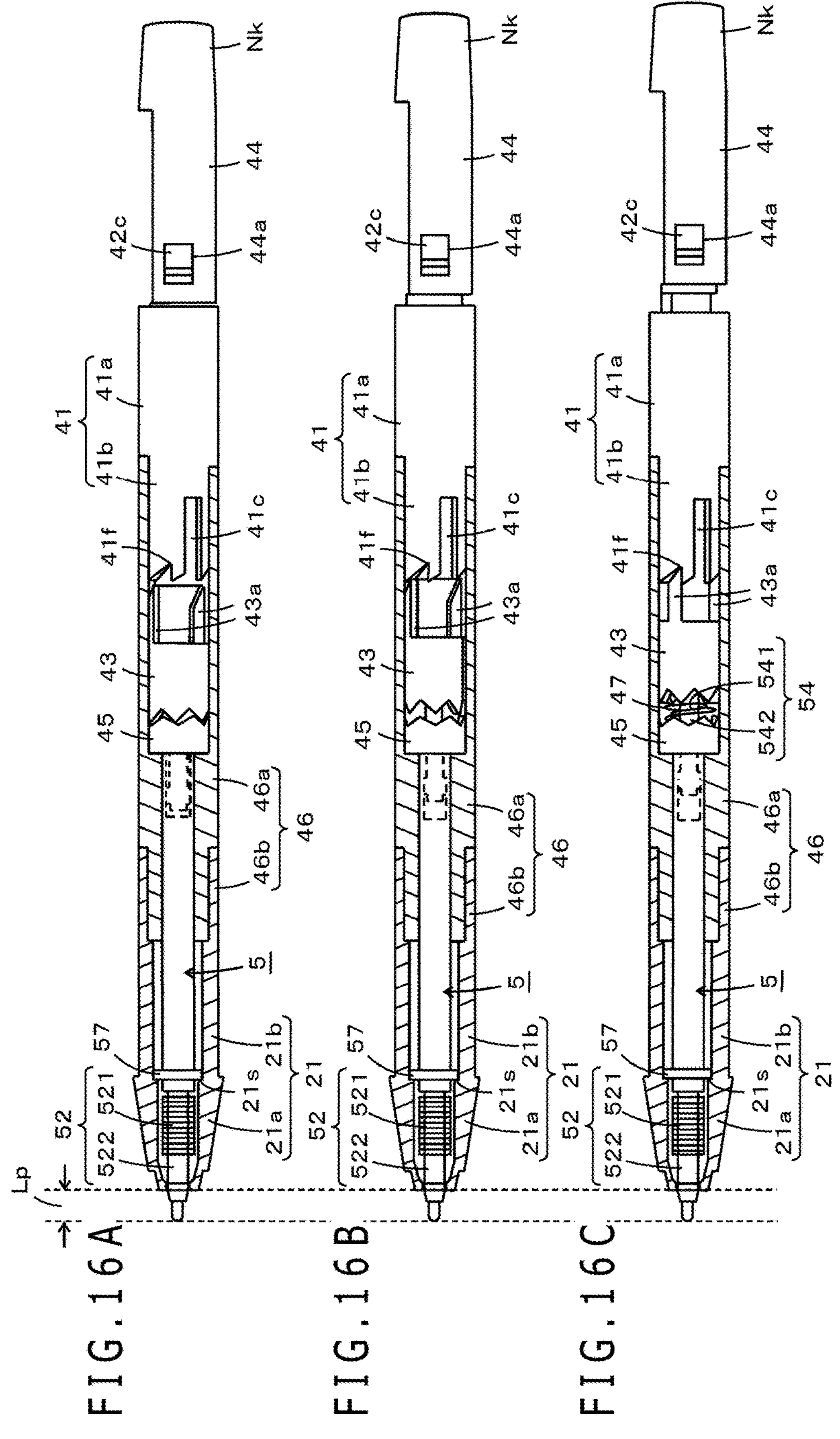
FIGS. 16A to 16C are diagrams for describing the action of the knock cam mechanism portion and the action of the pen tip side during the knock operation of the electronic pen body portion module included in the electronic pen according to the embodiment of the disclosure.

As illustrated in FIG. 16A, when the front shaft portion 43 and the gear portion 45 are completely engaged with each other, the front shaft portion 43 included in the rotor portion rotates by a predetermined angle. In this case, since the front shaft portion 43 is coupled to the back end side shaft portion 42 in a manner that the front shaft portion 43 can rotate, as described above, the back end side shaft portion 42 does not rotate. The writing input cartridge 5 is engaged with the protrusion portion on the inner wall surface of the pen tip side housing portion 21 at the location of the projection portion 57, and the writing input cartridge 5 does not rotate. However, the fitting projection portion 543 of the elastic displacement portion 54 on the back end side of the writing input cartridge 5 is fitted to the fitting recess portion 43*c* of the front shaft portion 43 through the spacer 48. Therefore, an unreasonable load is not applied to the front shaft portion 43, and the front shaft portion 43 rotates.

Subsequently, when the load applied to the knock operation portion Nk is reduced, force that separates the front shaft portion 43 from the gear portion 45 is generated as illustrated in FIG. 16B due to the elastic displacement force of the coil spring 542 of the elastic displacement portion 54 of the writing input cartridge 5, because the projection portion 57 of the writing input cartridge 5 and the step portion 21*s* of the pen tip side housing portion 21 are engaged with each other. Consequently, the front shaft portion 43 rotates while the blade portion 43*a* moves along the slope of the locking portion 41*f* of the small diameter portion 41*b* of the knock case portion 41 as illustrated in FIG. 16B, and the front shaft portion 43 is locked in the state in which the blade portion 43*a* is engaged with the locking portion 41*f* as illustrated in FIG. 16C. In this state, the elastic displacement portion 54 returns to the original length.

The function of the knock cam mechanism portion in the embodiment based on the knock operation locks the writing input cartridge 5 while the pen tip portion protrudes from the opening 2*a* of the pen tip side housing portion 21 by the defined protrusion length Lp. In the state of FIG. 16C, the contracted elastic displacement portion 54 of the writing input cartridge 5 returns to the original length, and the electronic pen 1 enters the use state of writing input in which the pen tip portion of the writing input cartridge 5 is delivered by the defined protrusion length Lp. The delivery of the pen tip portion of the writing input cartridge 5 in the knock operation is thus completed.

As is apparent from the description, the length in the axial direction by which the pen tip side of the writing input cartridge 5 moves in the knock operation is smaller than the length of the stroke in the axial direction (corresponding to the travel distance of the front shaft portion 43 in the axial direction) in the knock operation of the knock cam mechanism portion in which the pen tip side of the writing input cartridge 5 protrudes from the opening 2*a* of the pen tip side housing portion 21 of the pen housing 2. That is, the pen tip side of the writing input cartridge 5 moves by the same amount as the amount that the knock operation portion Nk is pushed, until the projection portion 57 collides with the step portion 21*s* of the pen tip side housing portion 21, but the pen tip side does not move more than that. When the pressure (load) against the coil spring 542 of the elastic displacement portion 54 is applied to the knock operation portion Nk, the elastic displacement portion 54 of the writing input cartridge 5 changes its length in the axial direction. The displacement in the length of the elastic displacement portion 54 is a part of the stroke necessary in the knock operation.

When the user brings the front end of the core body 51 of the pen tip into contact with the input surface of the position detection sensor and applies the pen pressure in the use state of the writing input cartridge 5 of FIG. 16C, the elastic displacement portion 54 is insensitive to the pen pressure, and the pen pressure detection portion 55 accurately detects the pen pressure applied to the front end of the core body 51.

When an impact load is applied to the pen tip side due to, for example, an accidental drop of the electronic pen 1 in the state in which the pen tip of the writing input cartridge 5 is delivered from the opening 2*a* of the pen housing 2 (pen tip side housing portion 21), the impact load is absorbed by the elastic displacement of the elastic displacement portion 54, and this can prevent the damage of the writing input cartridge 5. That is, the elastic displacement portion 54 plays a role of what is generally called a shock absorber. Note that the elastic displacement portion 54 similarly plays a role of a shock absorber when the impact load is applied to the back end cap member 44 side.

A pressure (load) against the elastic displacement force of the coil spring 542 of the elastic displacement portion 54 of the writing input cartridge 5 needs to be applied to the knock operation portion Nk in the electronic pen 1 of the embodiment to return the use state of writing input of FIG. 16C in which the pen tip portion of the writing input cartridge 5 is delivered by the defined protrusion length Lp to the state of FIG. 15A in which the pen tip portion of the writing input cartridge 5 is housed in the pen tip side housing portion 21. This is because the projection portion 57 of the writing input cartridge 5 and the step portion 21*s* in the pen tip side housing portion 21 are engaged with each other in the electronic pen 1 of the embodiment and the elastic displacement portion 54 needs to be contracted to release the engagement of the blade portion 43*a* of the front shaft portion 43 and the locking portion 41*f* of the small diameter portion 41*b* of the knock case portion 41. The front end portion of the writing input cartridge 5 returns to the state in which the front end portion is housed in the pen tip side housing portion 21 illustrated in FIG. 15A through a procedure opposite the procedure for the delivery of the front end portion of the writing input cartridge 5.

More specifically, when the pressure (load) against the elastic displacement force of the coil spring 542 of the elastic displacement portion 54 is applied to the knock operation portion Nk to push the back end cap member 44 in the state of FIG. 16C, the protrusion length of the pen tip side of the writing input cartridge 5 remains to be the defined protrusion length Lp because the step portion 21*s* of the pen tip side housing portion 21 and the projection portion 57 of the writing input cartridge 5 are engaged with each other. However, the elastic displacement portion 54 of the writing input cartridge 5 contracts in the axial direction, and the front shaft portion 43 is displaced toward the gear portion 45. Accordingly, the engagement of the blade portion 43*a* of the front shaft portion 43 and the locking portion 41*f* of the small diameter portion 41*b* of the knock case portion 41 are released, and the front end portion of the front shaft portion 43 is meshed with the gear portion 45 to rotate the front shaft portion 43.

The elastic return force of the coil spring 542 of the elastic displacement portion 54 and the elastic return force of the coil spring 47 for elastic return cause the front shaft portion 43 to move away from the gear portion 45 while rotating. The blade portion 43*a* of the front shaft portion 43 returns to the state of FIG. 15A in which the blade portion 43*a* is fitted to the groove portion 41*c* of the knock case portion 41, and the front end portion of the writing input cartridge 5 returns to the state in which the front end portion is housed in the pen tip side housing portion 21.

Effects of Electronic Pen 1 of Embodiment

As described above, in the knock operation of the electronic pen 1 of the embodiment, the step portion 21*s* of the pen tip side housing portion 21 and the projection portion 57 of the writing input cartridge 5 are engaged with each other. The state in which the pen tip side of the writing input cartridge 5 does not protrude more than the defined protrusion length Lp is maintained, and the elastic displacement of the elastic displacement portion 54 allows the knock cam mechanism portion to perform the delivery and return operation of the pen tip portion of the writing input cartridge 5.

Therefore, the presence of the projection portion 57 suppresses the displacement of the writing input cartridge 5, which is delivered by the knock operation, in the direction orthogonal to the axial direction. This also can prevent the coil 521 as an example of the part that should not come into contact with the inner wall surface of the pen tip side housing portion 21 on the pen tip side of the writing input cartridge 5 from coming into contact with the inner wall surface of the pen tip side housing portion 21.

In the electronic pen 1 of the embodiment, the knock cam mechanism portion is not activated unless the pressure (load) against the elastic displacement force of the coil spring 542 of the elastic displacement portion 54 is applied to the knock operation portion Nk to push the back end cap member 44 in the state illustrated in FIG. 16C in which the front end portion of the writing input cartridge 5 protrudes from the opening 2*a* of the pen tip side housing portion 21 to perform the writing input.

Therefore, in the state in which the front end portion of the writing input cartridge 5 protrudes from the opening 2*a* of the pen tip side housing portion 21 to perform the writing input as illustrated in FIG. 16C, the usability of the electronic pen 1 in the deletion instruction is excellent, in which the user reverses and switches the front end side and the back end side of the electronic pen 1 and brings the back end cap member 44 side of the electronic pen 1 into contact with the position detection sensor.

That is, when the back end cap member 44 side is pressed against the position detection sensor to perform the electronic deletion using the deletion cartridge 6 of the electronic pen 1, the knock operation of the knock cam mechanism portion is not performed unless a pressure (load) larger than the elastic displacement force of the coil spring 542 of the elastic displacement portion 54 of the writing input cartridge 5 is applied. Therefore, the deletion can be instructed while the strong pressure is applied, and the usability is excellent.

Moreover, in the electronic pen 1 of the embodiment, the front shaft portion 43 and the back end side shaft portion 42 are coupled to each other, and the back end cap member 44 including the knock operation portion Nk is coupled to the back end side shaft portion 42. Therefore, the back end cap member 44 including the knock operation portion Nk is held at the position of FIG. 16C. That is, the back end cap member 44 does not move in the axial direction, unlike the knock rod 12PR of the knock-type ballpoint pen in the state of FIG. 14D in which the knock rod 12PR freely goes back and forth between the position of the dotted line and the position of the solid line. This can improve the poorness of the usability in the case of the knock-type ballpoint pen.

The electronic pen 1 of the embodiment can be assembled by sequentially fitting a plurality of parts in the axial direction, and the electronic pen 1 also can be easily disassembled in the opposite procedure as described above. Therefore, individual parts can be replaced, and the economic performance is excellent.

Other Embodiments or Modifications

Although the front shaft portion 43 included in the rotor portion and the back end side shaft portion 42 included in the knock rod are coupled to each other in the electronic pen 1 of the embodiment, they may not be coupled to each other as long as the back end side shaft portion 42 can press and move the front shaft portion 43 in the axial direction.

Although the gear portion 45 is used in the embodiment to rotate the front shaft portion 43 as an example of the rotor portion, it is obvious that the configuration for rotating the rotor portion is not limited to this example.

Although the coil spring 47 of the knock cam mechanism portion and the coil spring 542 of the elastic displacement portion 54 of the writing input cartridge 5 are used and the engagement of the projection portion 57 and the step portion 21*s* of the pen tip side housing portion 21 is used to prevent the knock cam mechanism portion from operating unless a load larger than the load applied during the normal knock operation in the case of the conventional knock-type ballpoint pen or the like is applied in using the deletion cartridge 6 of the electronic pen 1 in the embodiment, the configuration is not limited to this.

For example, a spring with elastic property similar to the coil spring 542 is used as the coil spring 47 of the knock cam mechanism portion. The elastic displacement portion 54 is removed from the writing input cartridge 5, and the projection portion 57 and the step portion 21*s* are not provided. This also can prevent the knock cam mechanism portion from operating unless a load larger than the load applied during the normal knock operation in the case of the conventional knock-type ballpoint pen or the like is applied in using the deletion cartridge 6 of the electronic pen 1.

However, in that case, a large load also needs to be applied at the start of the knock operation, and the knock operation becomes difficult. In this regard, only the coil spring 47 of the knock cam mechanism portion needs to be elastically displaced at the start of the knock operation in delivering the pen tip side of the writing input cartridge 5 in the configuration of the electronic pen 1 of the embodiment, and the operation of the knock cam mechanism portion can be started with a relatively light load. This is excellent.

Although the stopper portion on the inner wall surface of the pen tip side housing portion 21 engaged with the projection portion 57 to prevent the writing input cartridge 5 from moving toward the pen tip is the step portion 21*s* formed by changing the diameter of the hollow portion of the pen tip side housing portion 21 in the embodiment, the stopper portion is not limited to the step portion 21*s*. Any stopper portion can be used as long as the stopper portion can be engaged with the projection portion 57 to prevent the writing input cartridge 5 from moving toward the pen tip. For example, the stopper portion may be a projection portion provided on the inner wall surface of the pen tip side housing portion 21 and engaged with the whole or part of the projection portion 57 to prevent the writing input cartridge 5 from moving toward the pen tip.

Although the projection portion 57 provided on the writing input cartridge 5 projects in the direction orthogonal to the axial direction of the cartridge housing 53 in the embodiment, the direction is not limited to the orthogonal direction as long as the projection portion 57 projects in the direction crossing the axial direction and is engaged with the step portion 21*s* of the pen tip side housing portion 21. Considering that case, the formation position of the step portion 21*s* and the formation position of the projection portion 57 are determined and selected on the basis of the engagement position of the step portion 21*s* and the projection portion 57.

Although the projection portion 57 is formed to protrude from the angle range parts separated from each other by 180 degrees on the outer circumference of the cartridge housing 53 in the embodiment, the configuration is not limited to this. The projection portion 57 may be formed to protrude in three ways from angle ranges separated from each other by 120 degrees, or one projection portion may be formed throughout a predetermined angle range on the outer circumference of the cartridge housing 53.

Figure 17A:
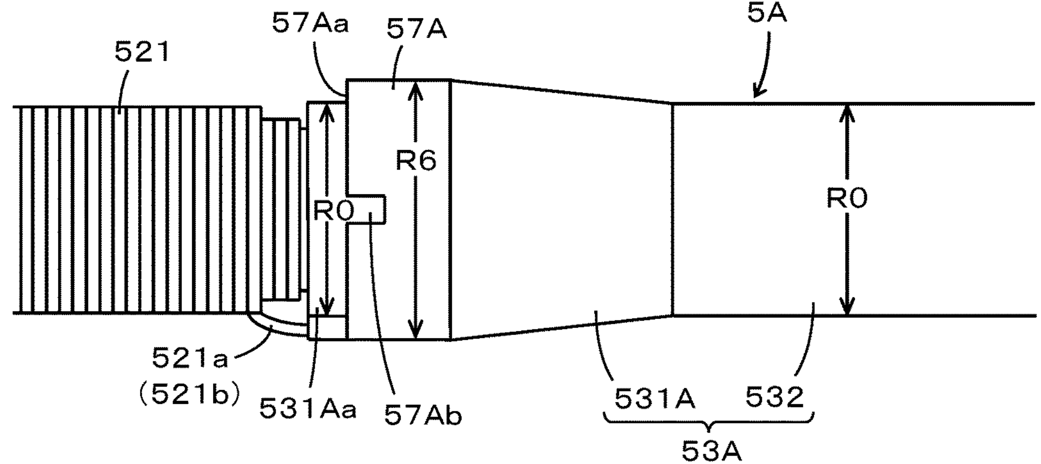
FIGS. 17A and 17B are diagrams for describing another example of the main parts of the first position indication portion in the electronic pen according to the embodiment of the disclosure.
Figure 17B:
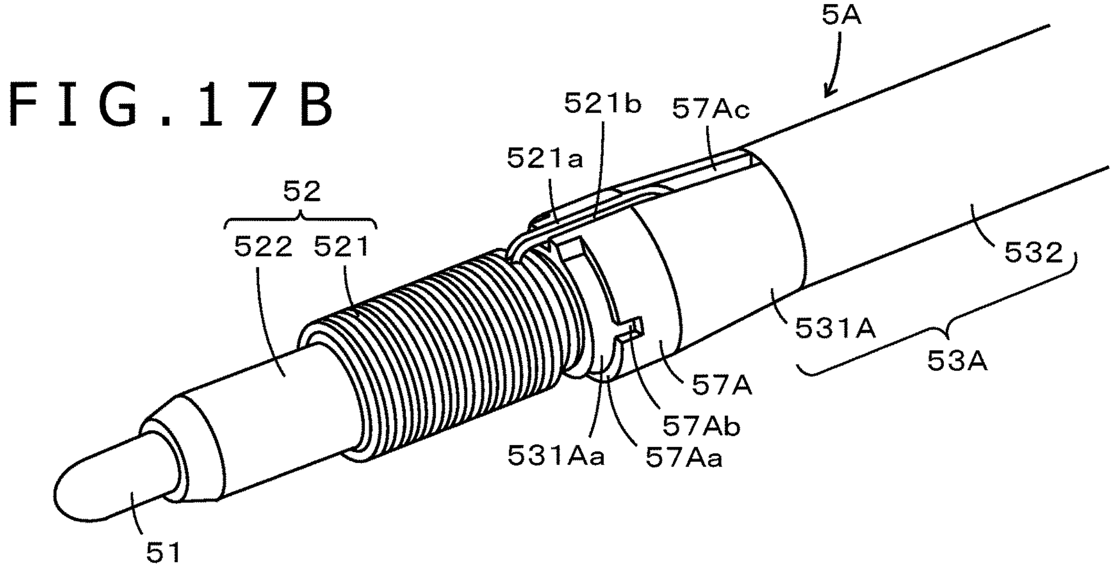

The projection portion 57 may be formed throughout the entire circumference of the cartridge housing 53. FIGS. 17A and 17B illustrate an example of forming the projection portion throughout the entire circumference of the cartridge housing 53, and this example is an example in which the shape of the holder portion 531 of the cartridge housing 53 is devised to form the projection portion.

FIG. 17A is an enlarged view of the side of a holder portion 531A of a cartridge housing 53A in the example coupled to the signal transmission member 52 including the coil 521 wound around the ferrite core 522. FIG. 17B is an enlarged perspective view of the part of the signal transmission member 52 including the coil 521 wound around the ferrite core 522 and the holder portion 531A of the cartridge housing 53A.

In the example of FIGS. 17A and 17B, the outer diameter of the holder portion 531A of the cartridge housing 53A is equal to the outer diameter R0 of the protection cover portion 532 at the position coupled to the pen tip side end portion of the protection cover portion 532. The holder portion 531A includes a projection shape portion 57A whose outer diameter gradually increases toward the pen tip from the outer diameter R0 at the position coupled to the protection cover portion 532 and whose maximum outer diameter is the diameter R6 substantially equal to or slightly smaller than the inner diameter R5 of the hollow portion 21*e* of the pen tip side housing portion 21. In the example of FIGS. 17A and 17B, a front end part 531Aa with the outer diameter equal to the outer diameter R0 of the protection cover portion 532 is formed on the pen tip side of the projection shape portion 57A.

Therefore, in the example as illustrated in FIGS. 17A and 17B, a step portion is generated at the boundary of the end portion of the projection shape portion 57A on the pen tip side and the front end part 531Aa, and an end surface 57Aa of the projection shape portion 57A included in the step portion is engaged with the step portion 21*s* of the pen tip side housing portion 21. Note that the front end part 531Aa may not be provided, and the holder portion 531A may be formed to include only the projection shape portion 57A. The end surface 57Aa of the projection shape portion 57A may be engaged with the step portion 21*s* that is an example of the stopper portion on the inner wall surface of the pen tip side housing portion 21.

In the embodiment, a recess portion 57Ab is provided at a predetermined angular position of the circumferential direction in the projection shape portion 57A of the holder portion 531A as illustrated in FIGS. 17A and 17B. Meanwhile, a projection portion to be engaged with the recess portion 57Ab is formed at a predetermined angular position of the circumferential direction on the inner wall surface near the step portion 21*s* of the pen tip side housing portion 21 in the case of the example. The projection portion of the pen tip side housing portion 21 is engaged with the recess portion 57Ab to prevent the writing input cartridge 5 from rotating about the axial direction. That is, the recess portion 57Ab is provided to prevent the rotation of the writing input cartridge 5.

In the example, a recess groove 57Ac along the axial direction is formed at a predetermined angular position of the circumferential direction on the outer circumference surface of the projection shape portion 57A of the holder portion 531A as illustrated in FIG. 17B. In the example, lead portions 521*a* and 521*b* at both ends of the coil 521 are placed in the recess groove 57Ac and led into the protection cover portion 532 as illustrated in FIG. 17B. The circuit board held by the holder portion 531A is present in the protection cover portion 532, and the lead portions 521*a* and 521*b* of the coil 521 are connected to the capacitor arranged on the circuit board to form the resonant circuit.

Although the elastic displacement portion 54 of the writing input cartridge 5 is provided on the back end side of the cartridge housing 53 or 53A in the embodiment, the elastic displacement portion 54 may be provided in the middle of the cartridge housing 53. For example, the protection cover portion 532 of the cartridge housing 53 or 53A may be divided into two portions, and the elastic displacement portion 54 may be provided in the middle of the divided protection cover portions 532.

Note that the pen tip portion of the first position indication portion for writing input may be able to leave a writing trace on a writing medium, such as paper, and a deletion function portion that deletes the writing trace on the writing medium may be provided on the front end portion of the knock portion Nk on the back end side. For example, the core body of the writing input cartridge 5 included in the first position indication portion may be provided by a material containing, for example, black lead to leave the writing trace on the writing medium, such as paper, and an eraser member for erasing the writing trace formed by the black lead may be provided on the front end portion of the knock portion Nk on the back end side.

Note that, in the embodiment, although the first position indication portion is a component for writing input and the second position indication portion is a component for deletion, both the first position indication portion and the second position indication portion may be components for writing input.

Although the first position indication portion and the second position indication portion are electronic pen cartridges in the embodiment, one or both of them may not be the electronic pen cartridges.

In the embodiment, the electronic pen has a special configuration in which a plurality of parts can be sequentially coupled to each other to assemble the electronic pen and the assembled electronic pen can easily be separated into a plurality of parts by releasing the coupling in the procedure opposite the procedure for the assembly. However, it is obvious that the configuration is not limited to this.

Although the case of the electronic pen of electromagnetic resonance system has been described in the embodiment, the system is not limited to the electromagnetic resonance system, and the embodiment also can be similarly applied to a case of an electronic pen of capacitance system, such as active capacitance system. Note that the first position indication portion and/or the second position indication portion may also be the electronic pen cartridge in the case of the electronic pen of capacitance system.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:

a pen housing;

a first position indication portion arranged on a first end side of the pen housing in an axial direction of the pen housing;

a second position indication portion arranged on a second end side of the pen housing in the axial direction; and a knock cam mechanism portion driven by a load in the axial direction applied from the second end side in the axial direction, wherein the first position indication portion is arranged such that a front end side that indicates a position is able to be pushed in and out by the knock cam mechanism portion from an opening on the first end side of the pen housing in the axial direction, and wherein the second position indication portion is arranged such that a front end side that indicates a position is located on the second end side in the axial direction; and an elastic member for the knock cam mechanism portion to push in and out the front end side of the first position indication portion from the opening when a pressure larger than a pressure applied to the front end side of the second position indication portion during use of the second position indication portion is applied to the second end side in the axial direction, wherein the knock cam mechanism portion includes an elastic return member that returns a state in which the front end side of the first position indication portion protrudes from the opening to a state in which the front end side of the first position indication portion is housed in the pen housing, and wherein the elastic member includes the elastic return member.

2. The electronic pen according to claim 1, wherein the knock cam mechanism portion includes a cam body portion, a knock rod portion, and a rotor portion, the knock rod portion and the rotor portion are coupled to each other in the axial direction in the pen housing, and a side opposite the front end side of the first position indication portion in the axial direction is locked to the rotor portion, and the second position indication portion is arranged on the knock rod portion.

3. The electronic pen according to claim 1, wherein the knock cam mechanism portion includes an elastic return member that returns a state in which the front end side of the first position indication portion protrudes from the opening to a state in which the front end side of the first position indication portion is housed in the pen housing, the first position indication portion includes an elastic displacement portion that is insensitive in a range of a pressure applied to the front end side during use and that elastically contracts and displaces a length of the first position indication portion or the second position indication portion in the axial direction according to an applied load when the load is larger than the range of the pressure, a projection portion protruding in a direction crossing the axial direction is formed at a predetermined position of the first position indication portion in the axial direction, a stopper portion is formed on an inner wall surface of a hollow portion of the pen housing, the stopper portion being engaged with the projection portion in a state in which the front end side of the first position indication portion is exposed outside from the opening of the pen housing, to prevent the first position indication portion from moving to the front end side in the pen housing, and the elastic member includes the elastic return member and the elastic displacement portion.

4. The electronic pen according to claim 3, wherein the knock cam mechanism portion includes a cam body portion, a knock rod portion, and a rotor portion, the knock rod portion and the rotor portion are coupled to each other in the axial direction in the pen housing, and a side opposite the front end side of the first position indication portion in the axial direction is locked to the rotor portion, and the second position indication portion is arranged on the knock rod portion.

5. The electronic pen according to claim 4, wherein the elastic return member is arranged between a predetermined position in the axial direction in the hollow portion housing the first position indication portion in the pen housing and the rotor portion.

6. The electronic pen according to claim 4, wherein the elastic displacement portion is provided on an end portion on a side opposite the front end side in the axial direction with respect to the first position indication portion, and a fitting portion fitted and locked to the rotor portion is provided on the elastic displacement portion.

7. The electronic pen according to claim 3, wherein the elastic displacement portion is provided on a side opposite the front end side in the axial direction with respect to the first position indication portion.

8. The electronic pen according to claim 3, wherein the stopper portion includes a step portion formed on the inner wall surface of the pen housing, and the projection portion is arranged such that a length of the first position indication portion in the axial direction from a front end position of the front end side to a part of the projection portion engaged with a step portion is a sum of a length in the axial direction from a front end position of the front end side of the pen housing to the step portion and a length in the axial direction by which the front end side of the first position indication portion is set to protrude from the opening of the pen housing during use of the electronic pen.

9. The electronic pen according to claim 3, wherein a length of a stroke in the axial direction during a knock operation of the knock cam mechanism portion in protruding the front end side of the first position indication portion from the opening of the pen housing is larger than a length in the axial direction by which a front end portion of the first position indication portion moves during the knock operation.

10. The electronic pen according to claim 3, wherein, in protruding the front end side of the first position indication portion from the opening of the pen housing, the knock cam mechanism portion is operated by a pressure against an elastic displacement force of the elastic return member until the projection portion of the first position indication portion is engaged with the stopper portion of the pen housing, and the knock cam mechanism portion is operated by the pressure against the elastic displacement force of the elastic displacement portion after the projection portion of the first position indication portion is engaged with the stopper portion of the pen housing.

11. The electronic pen according to claim 3, wherein the knock cam mechanism portion includes a cam body portion, a knock rod portion, and a rotor portion, the rotor portion, in operation, moves in the axial direction according to a movement of the knock rod portion to the front end side of the first position indication portion, and the rotor portion is engaged with a cam piece of the cam body portion, and a gear portion that rotates the rotor portion by a predetermined angle when the rotor portion is engaged is provided at a predetermined position of the rotor portion in the axial direction engaged with an end portion on a front end portion side of the first position indication portion in the pen housing.

12. The electronic pen according to claim 3, wherein the stopper portion includes a step portion formed on the inner wall surface of the pen housing.

13. The electronic pen according to claim 1, wherein the knock cam mechanism portion includes a cam body portion, a knock rod portion, and a rotor portion, and the knock rod portion includes a body, and at least a part of the second position indication portion on a side opposite the front end side is housed in the body.

14. The electronic pen according to claim 13, wherein the front end side of the second position indication portion is covered by a portion.

15. The electronic pen according to claim 1, wherein the front end side of the second position indication portion is covered by a cap-shaped member.

16. The electronic pen according to claim 1, wherein the first position indication portion is used for a writing input or for a drawing input, and the second position indication portion is used for deletion of the writing input or the drawing input of the first position indication portion.

17. The electronic pen according to claim 1, wherein the first position indication portion and the second position indication portion operate according to an electromagnetic resonance system.

18. The electronic pen according to claim 1, wherein the first position indication portion and the second position indication portion operate according to an active capacitance system.

19. The electronic pen according to claim 1, wherein the first position indication portion includes a cartridge including a module of an electronic circuit arranged in a housing and an interaction portion that interacts with a position detection sensor.

20. The electronic pen according to claim 1, wherein the second position indication portion includes a cartridge including a module of an electronic circuit arranged in a housing and an interaction portion that interacts with a position detection sensor.

* * * * *